(12) United States Patent
Ishida

(10) Patent No.: US 10,878,606 B2
(45) Date of Patent: Dec. 29, 2020

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Tomoya Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 15/997,012

(22) Filed: Jun. 4, 2018

(65) Prior Publication Data

US 2018/0357806 A1 Dec. 13, 2018

(30) Foreign Application Priority Data

Jun. 13, 2017 (JP) .................... 2017-115990

(51) Int. Cl.

| | |
|---|---|
| *G06K 9/00* | (2006.01) |
| *G06T 11/60* | (2006.01) |
| *G06F 3/147* | (2006.01) |
| *G06F 3/0482* | (2013.01) |
| *G06Q 30/06* | (2012.01) |
| *G06F 3/0481* | (2013.01) |
| *G09G 5/14* | (2006.01) |

(52) U.S. Cl.
CPC ............ *G06T 11/60* (2013.01); *G06F 3/0482* (2013.01); *G06F 3/147* (2013.01); *G06Q 30/0633* (2013.01); *G06Q 30/0643* (2013.01); *G06F 3/04817* (2013.01); *G06F 2203/04805* (2013.01); *G09G 5/14* (2013.01); *G09G 2380/14* (2013.01); *G09G 2380/16* (2013.01)

(58) Field of Classification Search
CPC combination set(s) only.
See application file for complete search history.

(56) References Cited

U.S. PATENT DOCUMENTS

| | | | |
|---|---|---|---|
| 7,970,240 B1* | 6/2011 | Chao ................... | G06F 3/04817 |
| | | | 382/305 |
| 2006/0150092 A1* | 7/2006 | Atkins .................... | G06T 11/60 |
| | | | 715/251 |
| 2006/0181736 A1* | 8/2006 | Quek ................... | G03D 15/005 |
| | | | 358/1.18 |
| 2008/0123993 A1* | 5/2008 | Widdowson ............ | G06T 11/60 |
| | | | 382/284 |

FOREIGN PATENT DOCUMENTS

JP            2013-33453 A       2/2013

* cited by examiner

*Primary Examiner* — Alex Kok S Liew
(74) *Attorney, Agent, or Firm* — Canon U.S.A., Inc. IP Division

(57) ABSTRACT

An information processing apparatus configured to lay out at least some of a plurality of images includes an acquisition unit configured to acquire data on the plurality of images, a layout processing unit configured to execute processing for layout based on the data on the plurality of images which is acquired by the acquisition unit, and a standby processing unit configured to execute processing for displaying a standby screen while the processing for layout is executed by the layout processing unit, wherein the standby processing unit displays in the standby screen a predetermined number of images among the plurality of images acquired by the acquisition unit.

23 Claims, 17 Drawing Sheets

INFORMATION PROCESSING APPARATUS, CONTROL METHOD, AND STORAGE MEDIUM

BACKGROUND

Field of the Disclosure

The present disclosure generally relates to information processing and, more particularly, to an information processing apparatus, a control method, and a storage medium. In particular, information processing technology of the present disclosure generally relates to advancements and/or improvements in display control.

Description of the Related Art

There is photo album creation software which selects pictures suitable for use in an album from a plurality of user-selected pictures and automatically lays out the selected pictures. The function of automatically selecting pictures and laying out the selected pictures in an album is called an automatic layout function. Japanese Patent Application Laid-Open No. 2013-33453 discusses a technique in which a plurality of pictures is analyzed to give a score to each of the pictures and the pictures to which a high score is given are employed as pictures to be laid out in an album.

The software having the automatic layout function as discussed in Japanese Patent Application Laid-Open No. 2013-33453 needs to perform picture (image) analysis processing for a layout, and the user needs to wait until the analysis processing is completed and a layout result is displayed. This standby time increases as the number of images to be analyzed is larger, and the user is likely to stop the analysis processing when a display screen remains unchanged for a long time or is monotonous.

It is conceivable that sample images and template pictures which are internally stored are displayed during the standby period, but the same images and pictures are displayed every time to cause a monotonous screen.

SUMMARY

The present disclosure generally relates to a standby screen which does not become monotonous and is likely to evoke an image of a layout during a standby time until a layout result is displayed.

According to one or more aspects of the present disclosure, an information processing apparatus configured to lay out at least some of a plurality of images includes an acquisition unit configured to acquire data on the plurality of images, a layout processing unit configured to execute processing for layout based on the data on the plurality of images which is acquired by the acquisition unit, and a standby processing unit configured to execute processing for displaying a standby screen while the processing for layout is executed by the layout processing unit, wherein the standby processing unit displays in the standby screen a predetermined number of images among the plurality of images acquired by the acquisition unit.

Further features of the present disclosure will become apparent from the following description of exemplary embodiments with reference to the attached drawings.

DESCRIPTION OF THE EMBODIMENTS

Various exemplary embodiments of the present disclosure will be described in detail below with reference to the attached drawings. It should be noted that the exemplary embodiments described below are not intended to limit the scope of the present disclosure and not every combination of features described in the exemplary embodiments is always essential to the technical solution of the present disclosure. While a standby screen in a case of automatically laying out pictures to create a photo album (photo book) will be described as an example in the below-described exemplary embodiments, the exemplary embodiments of the present disclosure are not limited to the disclosed case. An exemplary embodiment of the present disclosure is also applicable to, for example, a standby screen in a case of laying out images other than pictures.

Figure 1:
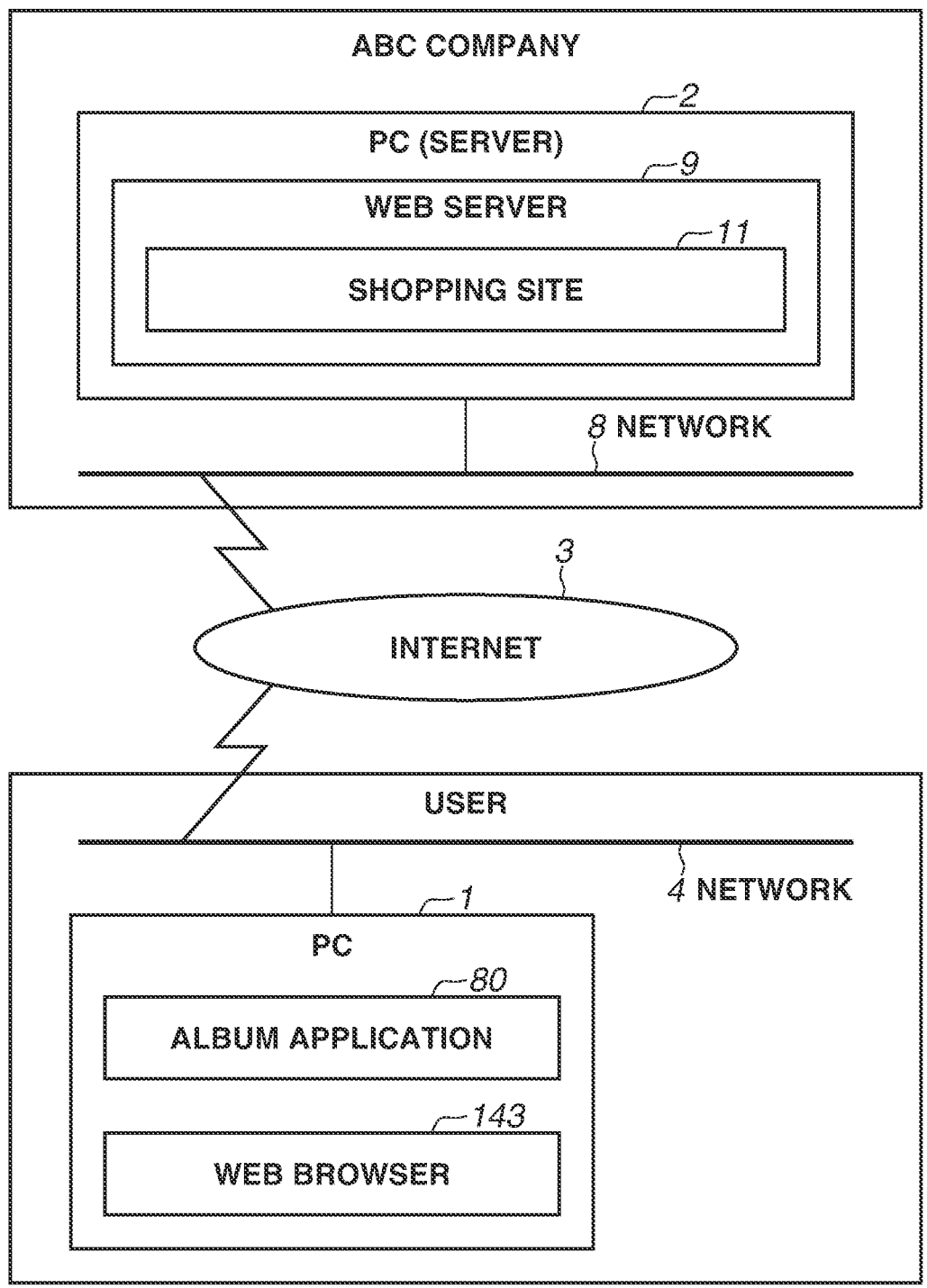
FIG. 1 illustrates the configuration of a system including an information processing apparatus.

A first exemplary embodiment will be described below. FIG. 1 illustrates an example of the configuration of an information processing system for creating/ordering a photo album. As illustrated in FIG. 1, the information processing system includes an information processing apparatus 1 which is used by a user and an information processing apparatus 2 of the company which creates photo albums. The information processing apparatuses 1 and 2 are connected via the Internet 3. The information processing apparatus 1 may be, for example, a personal computer (PC) or the like. The information processing apparatus 2 may be, for example, a server PC or the like. An operating system (hereinafter, sometimes abbreviated to "OS") equivalent to Windows (registered trademark) 8, Windows (registered trademark) Server 2012, or the like, may be installed in the information processing apparatuses 1 and 2. The information processing apparatuses 1 and 2 may be respectively connected to Ethernet (registered trademark) networks 4 and 8.

An application 80 (hereinafter, also referred to as "album application") for creating photo albums may be installed in the information processing apparatus 1. The application 80 may be configured in, for example, Windows (registered trademark)-executable file format (*.EXE) or the like. Further, a web browser application 143 (hereinafter, also referred to as "web browser") may be installed in the information processing apparatus 1. The web browser 143 is used at the time of using the World Wide Web (WWW). The network 4 may be a network for the user using the information processing apparatus 1, and examples of the network 4 may include a home network for household use, or the like.

The information processing apparatus 2 may include a web server 9 including a web server function and may provide, for example, a website of a predetermined company ("ABC Company" for this instance) via the Internet 3. A shopping site 11 is a shopping site of the ABC Company which provides services for users, and a user can order a photo album using the shopping site 11. When the photo album is ordered, print data is created by the information processing apparatus 2 based on album data created by the application 80. Then, printing is executed by a printer (not illustrated) and a photo album made of paper is created.

Figure 2:
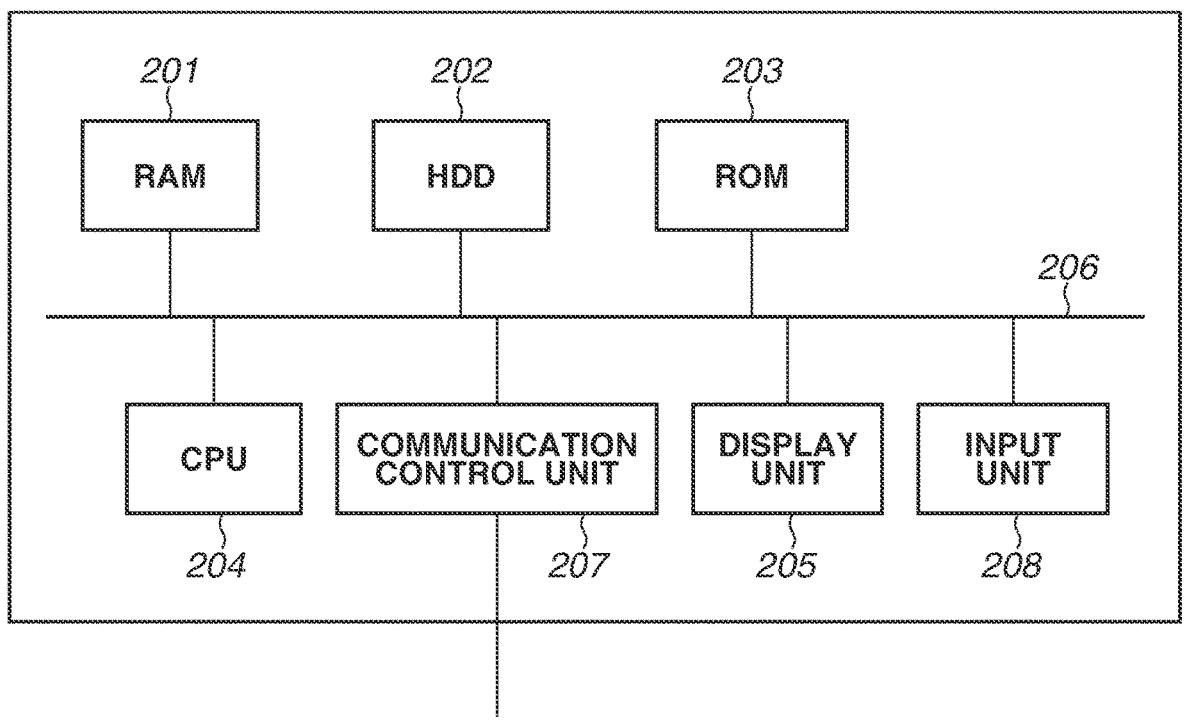
FIG. 2 illustrates the hardware configuration of the information processing apparatus.

FIG. 2 illustrates an example of the hardware configuration of the information processing apparatus 1. The configuration of the information processing apparatus 2 is similar to that of the information processing apparatus 1. However, the configurations of the information processing apparatuses 1 and 2 do not have to be similar. As illustrated in FIG. 2, the information processing apparatus 1 may include a central processing unit (CPU) 204, a random-access memory (RAM) 201, a read-only memory (ROM) 203, a hard disk drive (HDD) 202, a display unit 205, an input unit 208, and a communication control unit 207, all of which may be connected via a system bus 206.

The CPU (central processing unit/processor) 204 may include one or more processors and one or more memories, may be a system control unit, and may comprehensively control the information processing apparatus 1. Further, the CPU 204 may execute a display control method to be described in the present exemplary embodiment according to a program.

The RAM 201 is a random-access memory and provides a memory for temporarily storing various types of information during the execution of the program by the CPU 204. The ROM 203 stores the program to be executed by the CPU 204.

The HDD 202 is a storage medium configured to store image files and databases configured to hold results of processing such as image analysis processing. The HDD 202 stores applications such as the album the application 80 and the web browser 143 and modules (software) which will be described below with reference to FIG. 3, and the applications and the modules (software) are read onto the RAM 201 and executed by the CPU 204 as needed. In this way, the CPU 204 realizes the functions of the applications such as the application 80 and the web browser 143 and the modules (software) in FIG. 3.

The display unit 205 displays to the user a user interface (UI) and an image layout result according to the present exemplary embodiment. The display unit 205 can include a touch sensor function. The input unit 208 is used when the user performs various operations. For example, the input unit 208 is used to input predetermined information on the UI displayed on the display unit 205.

The communication control unit 207 is a device for communicating with external devices such as a printer and a server. For example, album data created through automatic layout is transmitted to the information processing apparatus 2 via the communication control unit 207.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Figure 3:
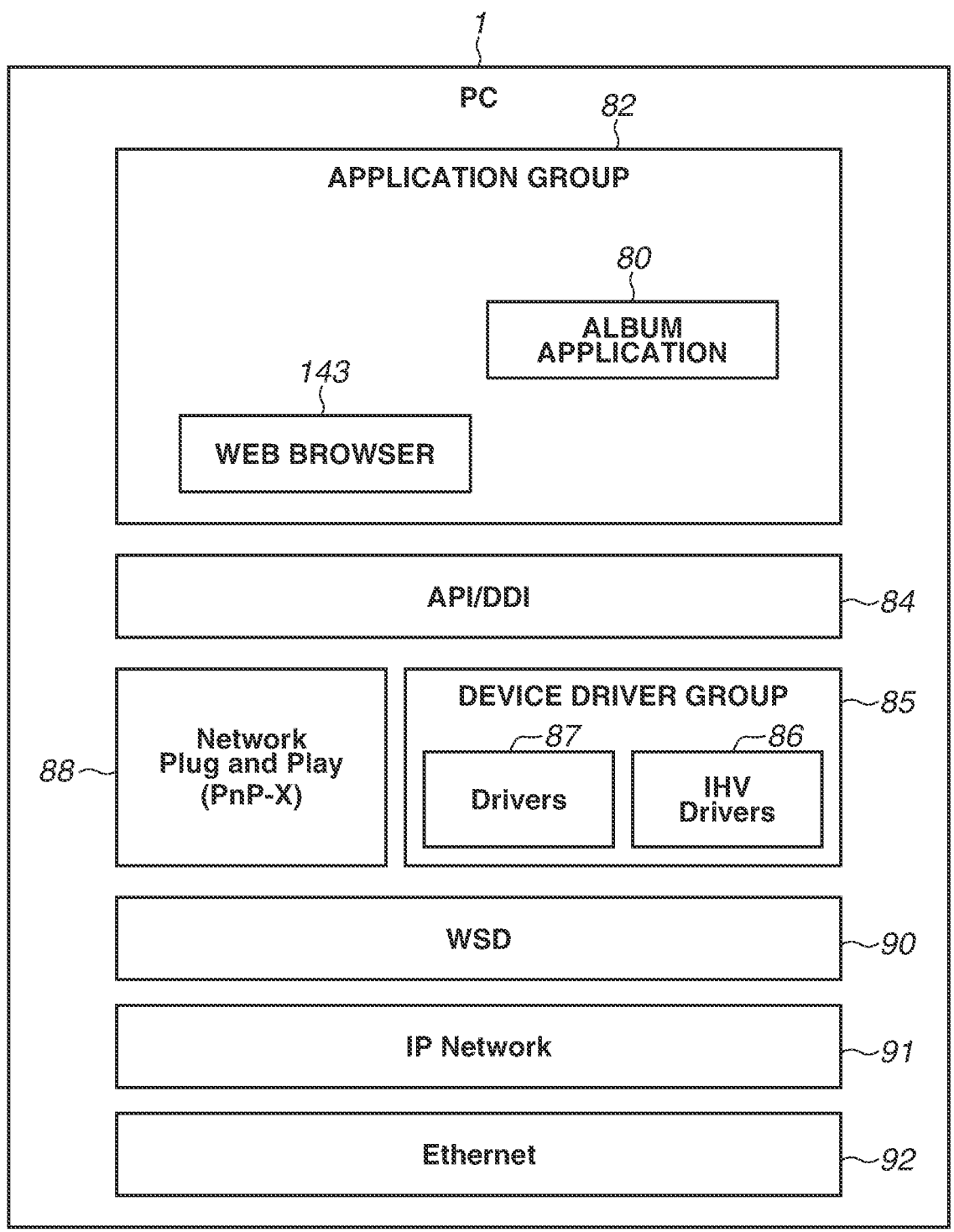
FIG. 3 illustrates the software configuration of the information processing apparatus.

FIG. 3 illustrates a configuration of a software module group that may be stored in the HDD 202 of the information processing apparatus 1. The software modules illustrated in FIG. 3 are not all but some of a software module group that may be stored in the HDD 202. Further, the software module group stored in the HDD 202 may be changed as appropriate for the OS installed in the information processing apparatus 1, the use environment of the information processing apparatus 1, or the like.

A module 92 may be an Ethernet control stack which controls Ethernet. A module 91 may be an Internet Protocol (IP) network control stack which controls IP networks. A module 90 may be a Web Services on Devices (WSD) control stack which controls WSD providing a scheme for device searches on networks. A module 88 may be a Plug and Play Extensions (PnP-X) control stack which controls Plug and Play of networks. PnP-X is the abbreviation of "plug and play extensions" and may be a function which provides support to network connection devices and may be a standard function installed in Windows 8 (registered trademark) as a series of plug-and-play extensions. A module 85 may be a device driver group including standard drivers 87 installed as the standard in the OS and independent hardware vendor (IHV) drivers 86 provided by IHVs.

A module 84 may be an application/device driver interface (DDI) interface including an application programming interface (API) and a DDI. An application group 82 may be an application group including the application 80 and the web browser 143.

[Setting Screen]

Figure 4:
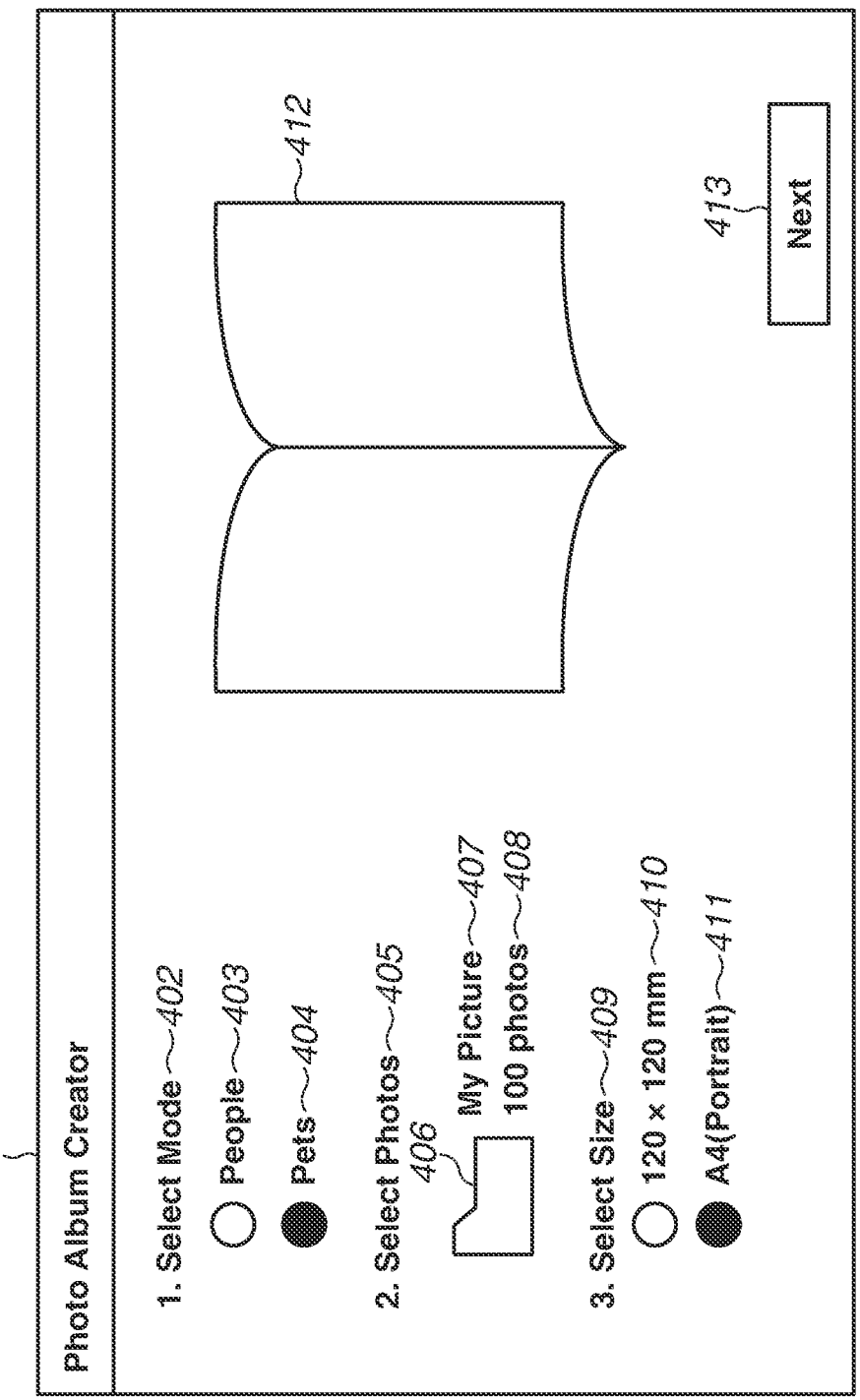
FIG. 4 is a schematic diagram illustrating a setting screen for creating a photo album.

FIG. 4 is a schematic view illustrating a condition setting screen which may be displayed when the application for creating photo albums is activated. On a photo album application display screen 401, the user can select a condition from a people mode 403 and a pets mode 404, which are the choices of a mode selection item 402. In a picture selection item 405, if an icon 406 which is an item for selecting a folder is selected, a dialog for selecting a folder containing a picture (image data) desired to be used in the album is displayed so that the user can select a desired folder. A plurality of pictures contained in the selected folder becomes layout candidates, and at least some of the plurality of pictures are extracted based on the condition selected in the mode selection item 402 to lay out the pictures of a person and/or pet on the album. In the mode selection item 402, if the people mode 403 is selected, the pictures of a person are preferentially extracted from the pictures selected in the picture selection item 405 and are laid out on the album. If the pets mode 404 is selected, the pictures of a pet may be preferentially extracted from the pictures selected in the picture selection item 405 and are laid out on the album. In the picture selection item 405, a name 407 which indicates the currently-selected folder and a number 408 which indicates the number of pictures contained in the folder are displayed. In the example in FIG. 4, 100 pictures among "My Picture" are selected.

The album size is selectable from the choices in a size selection item 409. In the example in FIG. 4, a 120×120 mm size 410 or a A4 (portrait) size 411 is selectable. A completed image 412 shows the user an image of the album to be created. The completed image 412 may be changed based on the results of selection in the mode selection item 402 and the size selection item 409. This makes it easy for the user to select a choice in the mode selection item 402 and the size selection item 409. For example, in the case where the people mode 403 is selected in the mode selection item 402, an image (sample image) of the album on which persons are laid out is displayed. Further, in the case where the pets mode 404 is selected, an image (sample image) of the album on which pets are laid out is displayed. Further, in the case where the 120×120 mm size 410 is selected in the size selection item 409, a square album is displayed in the completed image 412. In the case where the A4 (Portrait) size 411 is selected, a vertically-long album is displayed in the completed image 412. If a "Next" button 413 is selected, the screen may be changed to a design selection screen in FIG. 5.

Figure 5:
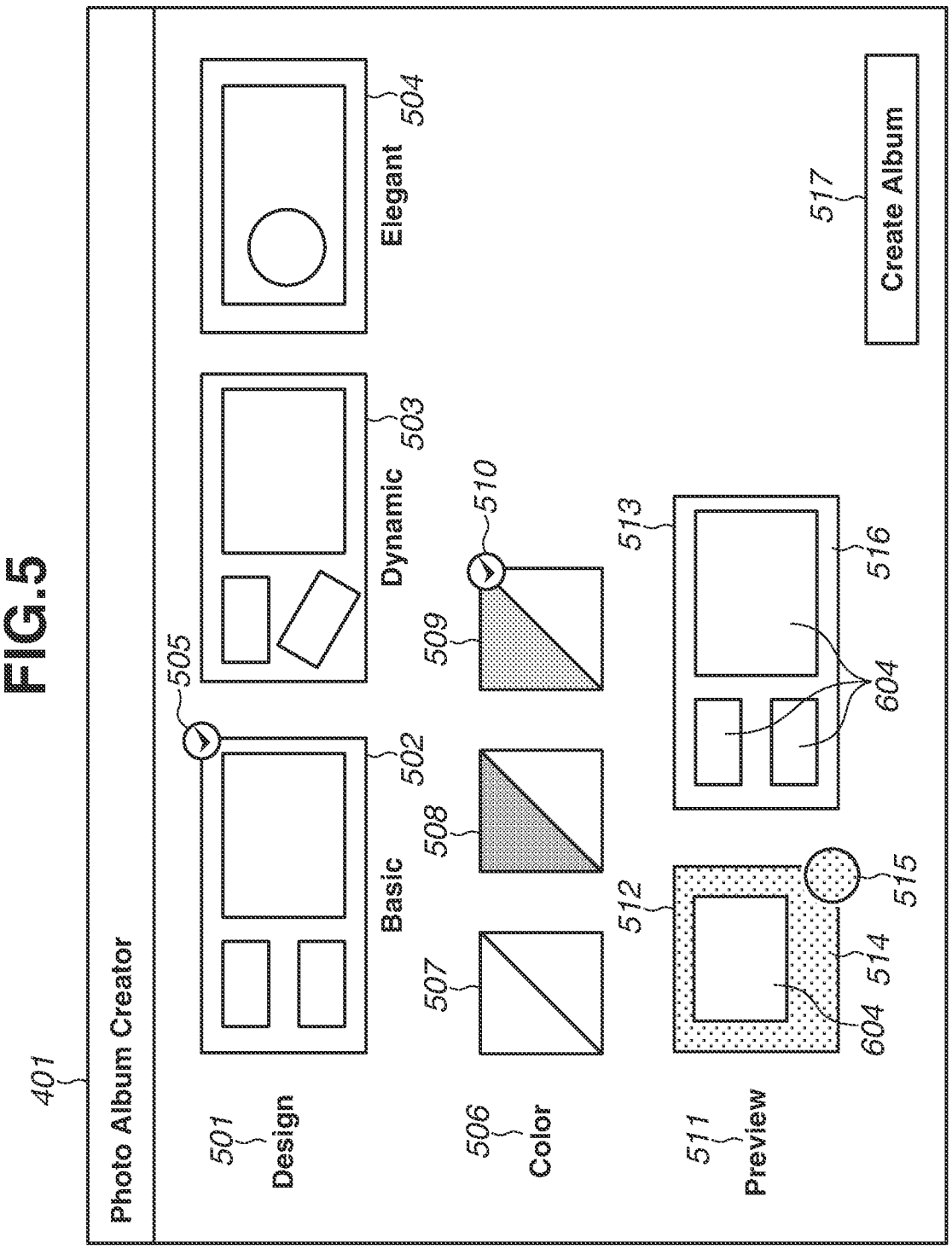
FIG. 5 is a schematic diagram illustrating a setting screen for creating a photo album.

FIG. 5 illustrates a design setting screen for selecting the design of a photo album. The design setting screen may include a design selection item 501, a color selection item 506, and a preview 511. The design selection item 501 may include three choices 502, 503, and 504 which are "Basic", "Dynamic", and "Elegant", respectively, and a check mark 505 is given to the currently-selected design. The color selection item 506 may include three choices 507, 508, and 509 which are "white" for the front page and "white" for the body, "black" for the front page and "white" for the body, and "texture" for the front page and "white" for the body. A check mark 510 may be given to the currently-selected color. Hereinafter, the choices 507, 508, and 509 will be referred to as color chips. Each color chip may include an upper left triangle and a lower right triangle. The upper left triangle may indicate the color or texture of the front page, whereas the lower right triangle indicates the color or texture of the body. In this way, the color or texture of the front page and the color or texture of the body are expressed by a single color chip.

The preview 511 shows how the choices selected in the design selection item 501 and the color selection item 506 may be reflected to the album. A front page image 512 and a body image 513 each contain a picture slot 604. In the example in FIG. 5, the color chip 509 selected in the color selection item 506 is the choice which is "texture" for the front page and "white" for the body, so that a background 514 of the front page image 512 is expressed in texture and a background 516 of the body image 513 in white. Further, a magnifying glass 515 is attached to the front page image 512, and the texture of the color chip 509 is enlarged and displayed on the magnifying glass 515. If the texture is expressed on the background 514 of the front page image 512, it is difficult to recognize details of the pattern because the pattern is too fine, so that the texture is enlarged by the magnifying glass 515 and displayed to make it easier to imagine a finished image. In FIG. 5, the background 514 of the front page image 512 is also expressed in texture. If the texture of this portion is too fine to be understood by the user, the portion can be expressed not in texture but in the background color of the texture, unlike the magnifying glass 515. For example, since the background of the front page of the color chip 509 is black texture, the background 514 of the front page image 512 can be expressed not in texture but in black. The body image 513 is expressed in "Basic" design because "Basic" is selected in the design selection 501. Further, the background 516 of the body image 513 is drawn in white because the body of the color chip 509 which is selected in the color selection 506 is "white". In this way, the front page image 512 and the body image 513 are changed depending on the design selection item 501 and the color selection item 506 so that the user can select with ease choices in the design selection item 501 and the color selection item 506. If a "Create Album" button 517 is selected, the automatic layout function starts analyzing pictures, and photo album creation is started based on the conditions selected and designated on the album basic setting screen in FIG. 4 and the design setting screen in FIG. 5.

[Photo Album Generation Processing]

Figure 15:
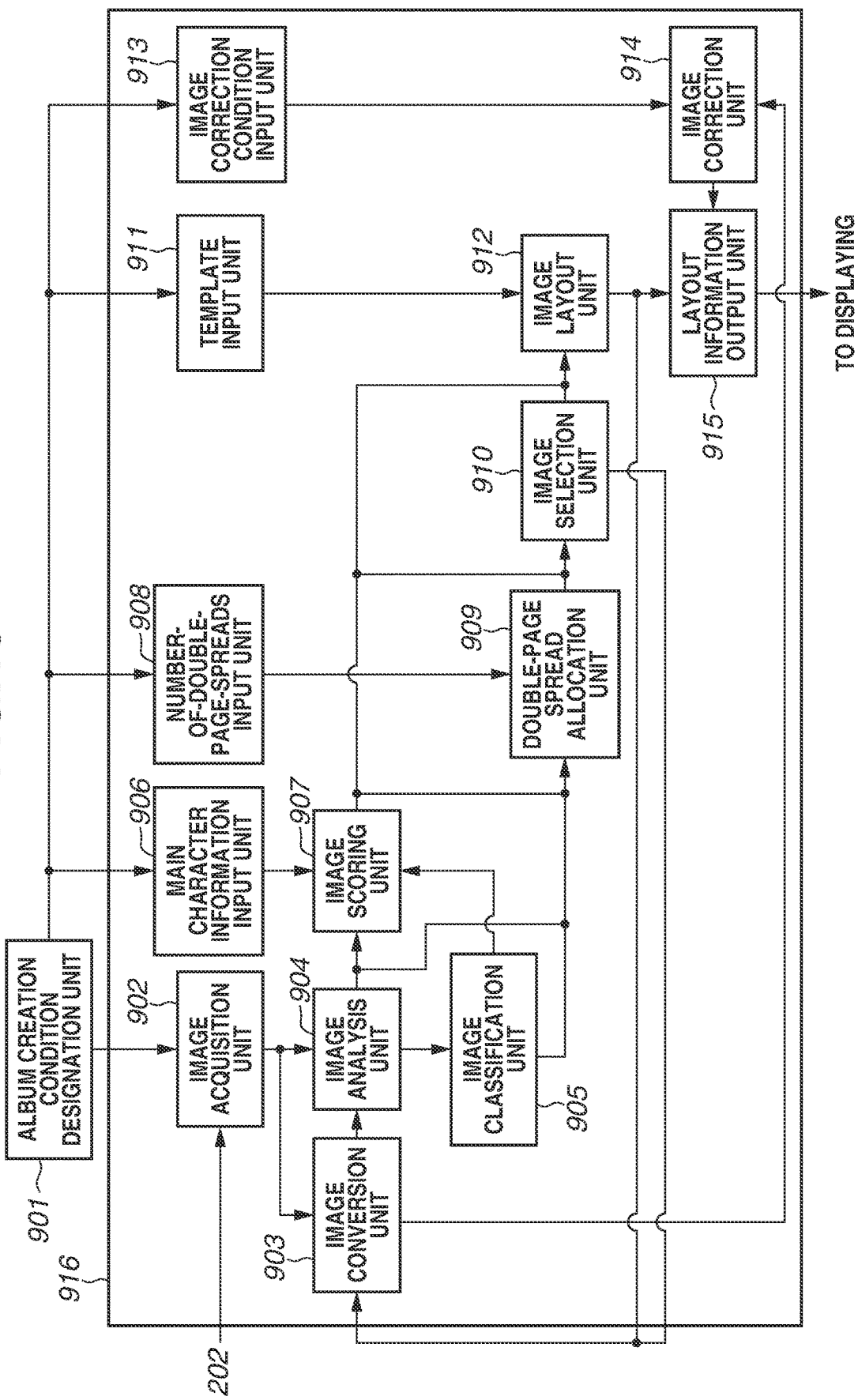
FIG. 15 illustrates an automatic layout processing unit of an album creation application.
Figure 16:
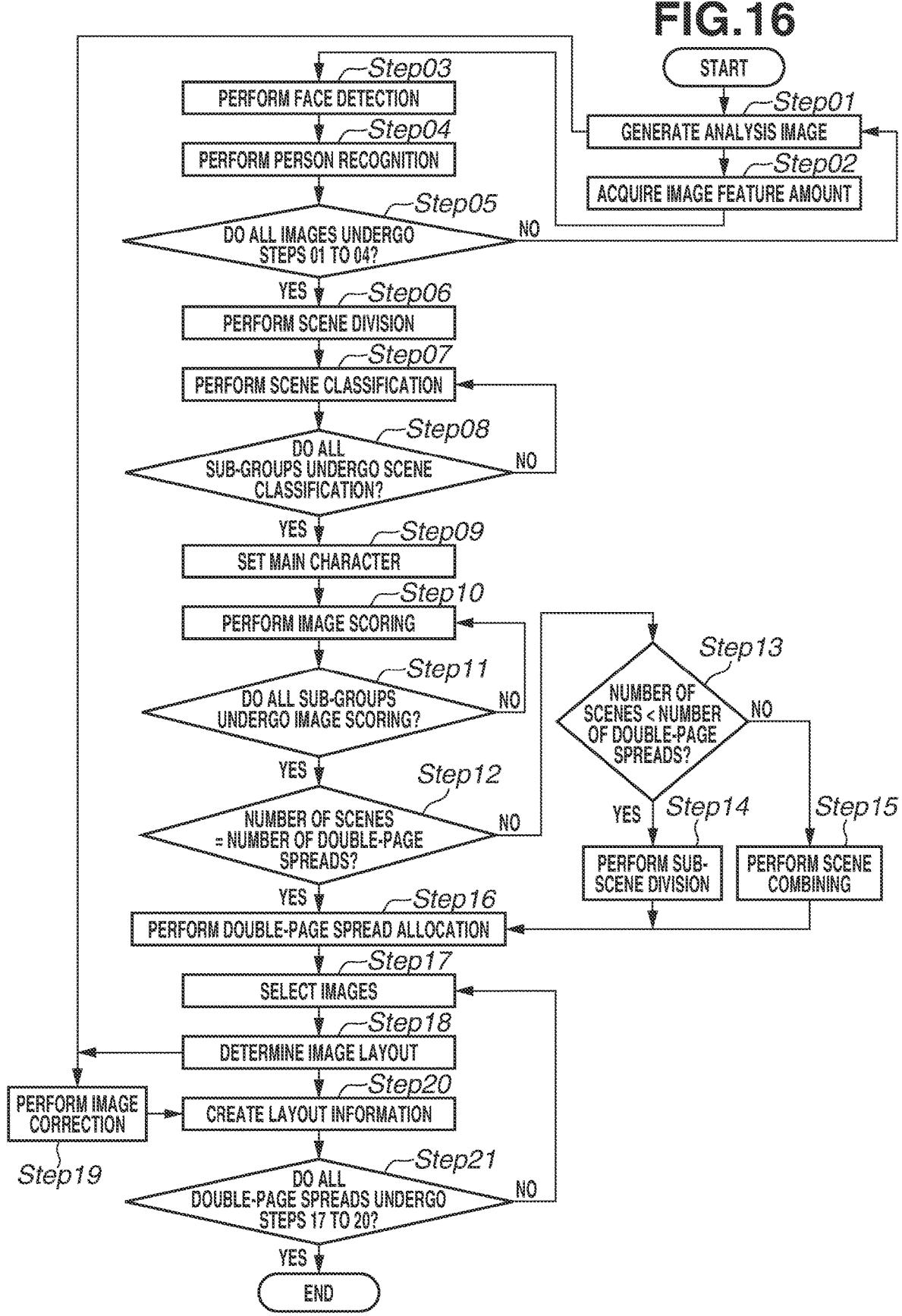
FIG. 16 is a flowchart illustrating a process of automatic layout processing.

An album creation method according to the present exemplary embodiment will be described below with reference to FIGS. 15 to 17. FIG. 15 is a block diagram illustrating software configuration(s) of some of the functional configuration(s) of the album creation application. While the album creation application includes various functions, especially the automatic layout function to be provided by an automatic layout processing unit 916 will be described in the present exemplary embodiment. The automatic layout function is the functional configuration(s) of classifying captured pictures based on the contents, attributes, etc. of the captured pictures or selecting pictures and laying out the selected pictures to generate an album image to be displayed on the display unit 205.

In the present exemplary embodiment, the album creation application may be activated at the press of the application icon displayed on the display unit 205 by the user. As illustrated in FIG. 15, the album creation application may include an album creation condition designation unit 901 and the automatic layout processing unit 916. An album creation condition may be designated to the automatic layout processing unit 916 according to a user interface (UI) operation performed via the input unit 208 such as a mouse.

An image acquisition unit 902 may acquire from the HDD 202 the image group designated by the album creation condition designation unit 901. As used herein, the term "image group" refers to a data group of candidate images to be laid out at the time of creating one album. For example, in a case where January 1, XX to December 31, XX is designated by the album creation condition designation unit 901, the image group corresponds to an image group in which all images captured from January 1, XX to December 31, XX are designated. The album creation condition designation unit 901 may function as a setting processing unit which sets album creation conditions based on the user selections made on the setting screens in FIGS. 4 and 5.

An image conversion unit 903 may convert image data to be used in subsequent processing into the desired number of pixels and color information. In the present exemplary embodiment, the image conversion unit 903 may convert image data into an analysis image of the number of shorter-side pixels and standard red, green, and blue (sRGB) color information.

An image analysis unit 904 may perform feature amount acquisition, face detection, facial expression recognition, and person recognition, which will be described below, on the analysis image. Further, the acquisition of image capturing time/date from data which accompanies the images acquired from the HDD 202, e.g., exchangeable image file format (Exif) information, may also be performed at the image analysis unit 904.

An image classification unit 905 may perform, on the image group, scene division and scene classification, which will be described below, using image capturing time/date information, the number of captured images, and detected face information. The term "scene" refers to an image capturing scene such as a trip, daily life, or wedding ceremony. A scene can also be described as, for example, a set of images of a single image capturing target which are captured during a period of image capturing opportunity.

A main character information input unit 906 may input to an image scoring unit 907 an identifier (ID) (identification information) of a main character specified by the album creation condition designation unit 901.

The image scoring unit 907 may perform scoring on each image. In the present exemplary embodiment, the scoring is performed such that a high score is given to an image suitable for layout. When scoring is performed such that a high score is given to an image suitable for layout, the information acquired at the image analysis unit 904 and the information acquired at the image classification unit 905 are used. The image scoring unit 907 performs scoring on each image to give a high score to each image containing the main character identifier (ID) (identification information) input from the main character information input unit 906.

A double-page spread allocation unit 909 divides the image group and allocates the divided image group to respective double-page spreads. As used herein, the term "double-page spread" refers to, for example, a double-page spread at the time of creating an album and corresponds to two pages.

A number-of-double-page-spreads input unit 908 inputs to the double-page spread allocation unit 909 the number of double-page spreads of the album which is designated by the album creation condition designation unit 901.

The double-page spread allocation unit 909 divides the image group according to the input number of double-page spreads and allocates some of the image group to the respective double-page spreads. For example, if the number of double-page spreads is five, the acquired image group is divided into five sub-image groups, and one image group is allocated to each double-page spread.

An image selection unit 910 selects an image based on the scores given at the image scoring unit 907 from some of the image groups allocated to the respective double-page spreads at the double-page spread allocation unit 909.

A template input unit 911 inputs to an image layout unit 912 a plurality of templates corresponding to template information designated by the album creation condition designation unit 901.

The image layout unit 912 determines an image layout. Specifically, a template suitable for the images selected by the image selection unit 910 is selected from the templates input by the template input unit 911, and the layout (position) of the images is determined.

An image correction condition input unit 913 may input to an image correction unit 914 an ON/OFF condition of image correction designated by the album creation condition designation unit 901.

The image correction unit 914 may perform dodging correction, red-eye correction, and contrast correction. If the image correction condition is on, the image correction unit 914 performs correction on the images. On the other hand, if the image correction condition is off, the image correction unit 914 performs no correction. The image correction unit 914 undergoes processing to turn on/off the correction on the images input from the image conversion unit 903. The number of pixels of an image input from the image conversion unit 903 to the image correction unit 914 is changeable according to the size of the layout determined at the image layout unit 912.

A layout information output unit 915 outputs layout information for display on a display according to the image layout determined by the image layout unit 912. Examples of layout information include bitmap data in which the selected images are laid out on the selected template.

[Sequence of Automatic Layout Processing]

Next, the processing relating to the automatic layout processing unit 916 of the album creation application according to the present exemplary embodiment will be described below with reference to the flowchart in FIG. 16. For example, the CPU 204 reads a program stored in the HDD 202 into the ROM 203 or the RAM 201 and executes the program to realize the flowchart in FIG. 16. The sequence of the automatic layout processing will be described below with reference to FIG. 16.

In step 01, an analysis image is generated at the image conversion unit 903. Each image of the image group in the HDD 202 which is designated by the album creation condition designation unit 901 is converted into the desired number of pixels and color information. The number of pixels and color information to be converted are predetermined and stored. In the present exemplary embodiment, each image is converted into an analysis image of shorter-side pixels and sRGB color information.

In step 02, an image feature amount is acquired at the image analysis unit 904. The image capturing time/date is acquired from, for example, Exif information which accompanies the image data acquired from the HDD 202. Further, a feature amount is acquired from the analysis image generated in step 01. Examples of a feature amount include focus.

In step 03, face detection is performed at the image analysis unit 904. The face detection is performed on the analysis image generated in step 01. A publicly-known method can be used for the face detection, and examples thereof include Adaptive Boosting (Adaboost) which generates a strong classifier from a plurality of prepared weak classifiers. In the present exemplary embodiment, the detection of faces (objects) of persons is performed using the strong classifier generated by Adaboost. The upper left and lower right coordinate values of each detected face position are also acquired concurrently with face image extraction. As used herein, the term "image" refers to an image expressed by the image data generated in step 01. The two types of coordinates are identified so that the position and size of the face of the person are identified. While the detection of the faces of persons is described above, the detection target is not limited to the faces of persons, and a strong classifier for a different detection target such as animals, e.g., dogs or cats, flower, food, building, or objects, e.g., stationary articles, in place of the faces can be generated using Adaboost.

In step 04, person recognition is performed at the image analysis unit 904. First, the face image extracted in step 03 is compared with a representative face image stored for each personal ID in a face dictionary database to determine a similarity. Then, an ID with the highest similarity which is not less than a threshold value is determined as the ID of the extracted face image. If the similarity is less than the threshold value, the extracted face is registered as a new face of a new personal ID in the face dictionary database.

The image analysis information acquired in steps 02 to 04 is stored separately for respective IDs for identifying the images. The image capturing time/date information and the focus determination result which are acquired in step 02 and the number of faces and position information which are detected in step 03 are stored. The face position information is stored separately for each personal ID acquired in step 04. If no face is detected from the image data, the image capturing time/date information and the focus determination result which are acquired in step 02 are stored.

In step 05, whether all the images of the image group in the HDD 202 which is designated at the album creation condition designation unit 901 undergo steps 01 to 04 is determined. If not all the images undergo steps 01 to 04 (NO in step 05), the processing returns to step 01. On the other hand, if all the images undergo steps 01 to 04 (YES in step 05), the processing proceeds to step 06.

In step 06, scene division is performed at the image classification unit 905. The scene division refers to the division of the acquired image group into a plurality of sub-image groups according to the scene. Specifically, the image group is divided into a plurality of sub-image groups based on the image capturing time/date information acquired in step 02 using the time differences between the images. The image group is divided if the image capturing dates of the images are not consecutive, i.e., if a date on which no image is captured exists between the image capturing dates of the images.

In step 07, scene classification is performed at the image classification unit 905. While the case where the sub-image groups (scenes) are classified into three classifications which are "trip", "daily life", and "ceremony" is described as an example in the present exemplary embodiment, the classification is not limited to the described example. First, a plurality of sub-image groups for which a classification is predetermined from "trip", "daily life", and "ceremony" is acquired. The feature amounts of image capturing are acquired for each image group. Examples of feature amounts acquired in the present exemplary embodiment may include an image capturing period, the number of captured images, and the number of captured persons. Then, the mean value and standard deviation of the image capturing period, the mean value and standard deviation of the number of captured images, and the mean value and standard deviation of the number of captured persons per image are calculated with respect to the plurality of sub-image groups. Then, the scoring is performed for each scene with respect to the feature amounts of the image capturing period, the number of captured images, and the number of captured persons of each sub-image group based on the mean values and standard deviations of the respective feature amounts using the following formulas.

$$\text{Score}=50-|10\times(\text{mean value}-\text{feature amount})/\text{standard deviation}| \quad \text{(formula 1)}.$$

$$\text{Average score}=(\text{score of image capturing period}+\text{score of number of captured images}+\text{score of number of persons})/\text{the number of feature amount items} \quad \text{(formula 2)}.$$

In this way, an average score is calculated for each of "trip", "daily life", and "ceremony". A scene with the highest point for each sub-image group is classified as the scene of the sub-image group. If two or more scenes have the same point, the sub-image group is classified into a priority scene. For example, in the present exemplary embodiment, daily life>ceremony>trip, and the classification "daily life" has the highest priority. The classified scene is managed with a scene ID so that the scene is identifiable.

In step 08, whether all the sub-groups divided in step 06 undergo the scene classification in step 07 is determined. If not all the sub-groups undergo the scene classification (NO in step 08), the processing returns to step 07. On the other hand, if all the sub-groups undergo the scene classification (YES in step 08), the processing proceeds to step 09.

In step 09, main character setting is performed at the image scoring unit 907. The main character setting is performed on a user-designated image group, and there are two types of main character setting, automatic main character setting and manual main character setting. The automatic main character setting is performed based on the person recognition result in step 04 and the scene division result in step 06. The number of times each personal ID appears in the sub-image groups, the number of times each personal ID appears in each scene, the number of times of scenes each personal ID appears, etc. are identified from the result acquired in step 04, and a main character is automatically set based on the foregoing information. If the user designates a specific person, the personal ID corresponding to the person selected via the main character information input unit 906 is transmitted to the image scoring unit 907.

In step 10, scoring is performed at the image scoring unit 907. The scoring is the giving of a score which is a value referred to at the time of image selection and is determined based on an evaluation of each piece of image data from a viewpoint to be described below.

Figure 17:
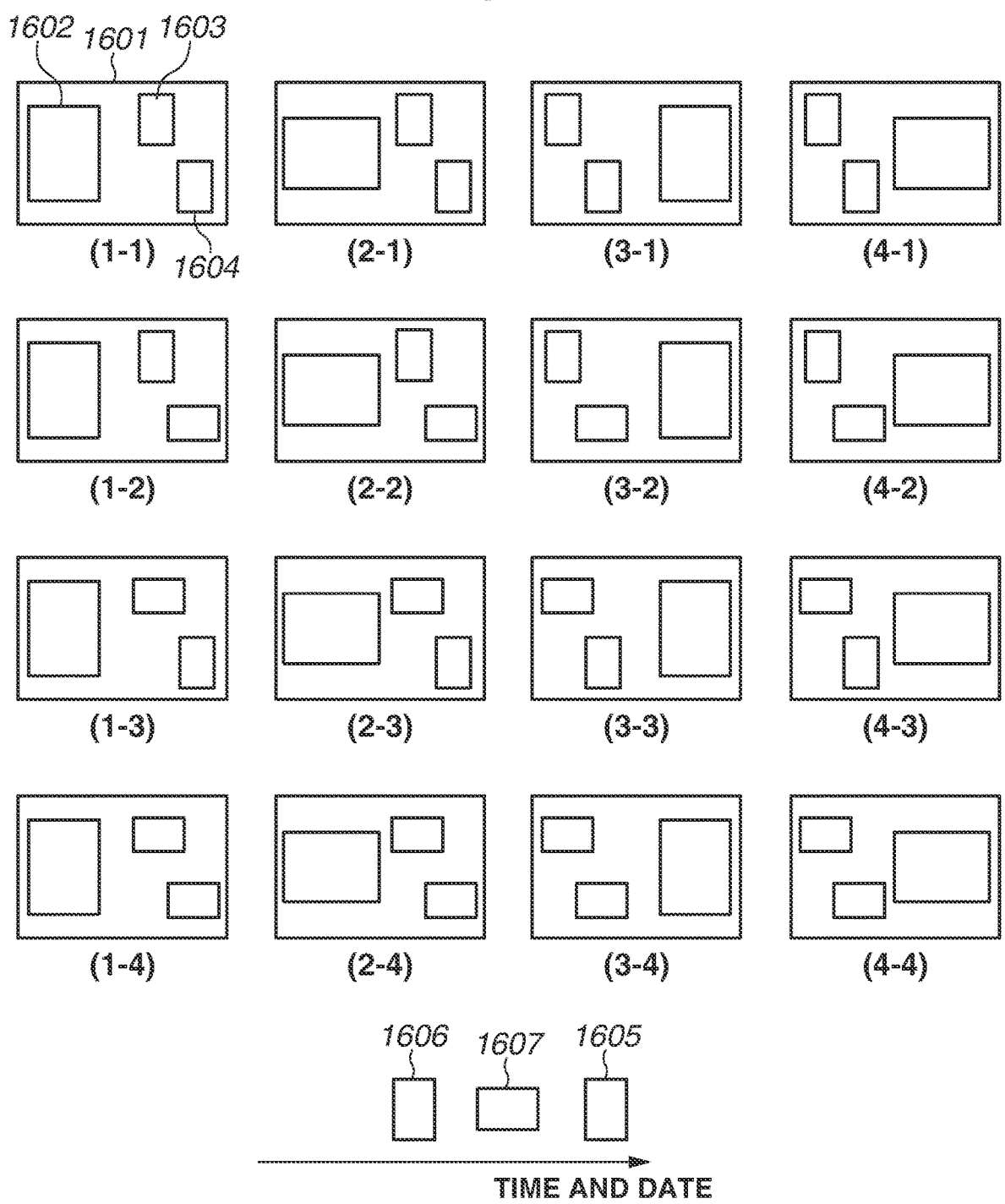
FIG. 17 illustrates an example of templates to lay out images.

FIG. 17 illustrates templates for use in laying out three images. A template 1601 of a template (1-1) in FIG. 17 is a single template and includes a main slot 1602 and sub-slots 1603 and 1604. The main slot 1602 is a main slot (frame where an image is to be laid out) in the template 1601 and is larger in size than the sub-slots 1603 and 1604. Further, a sub-slot is a slot other than the main slot in each template. Both a score for the main slot and a score for each sub-slot is given to each piece of image data. In scoring processing, a score for the main slot and a score for each sub-slot are both given to each image.

As a criterion for image data scoring, a table in which image features with high scores are specified for the main slot and the sub-slots with respect to the respective scenes "trip", "daily life", and "ceremony" is prepared in advance. For example, in the case where the scene classification of the sub-image group is "trip", a high score is likely to be given to an image containing a person and landscape, as a main slot, whereas a high score is likely to be given to an image of a close-up of a face or a side face, as a sub-slot. Thus, a feature with a high score, i.e., evaluation criterion, differs depending on the scene and slot types. In the present exemplary embodiment, the feature with a high score which corresponds to the scene and slot types is preset in the application and contained in the program. The feature with a high score is not limited to the above-described feature. A score is given to each piece of image data contained in each sub-image group based on the features of the main slot and the sub-slots of the respective scenes. The number of faces, the positions of the faces, and the sizes of the faces in each image are acquired, and the mean value and standard deviation are calculated for each slot type (main slot and sub-slot) with respect to each scene and stored in the program of the album creation application. Then, a score and an average score are calculated based on the mean value and standard deviation calculated in advance and the feature amounts of the number of faces of the main character ID in an image of interest, the positions of the faces, and the sizes of the faces using the following formulas.

Score=50−|10×(mean value−feature amount)/standard deviation|.

Average score=(score of number of faces+score of face position+score of face size)/number of feature amount items.

The scoring is performed for both the main slot and the sub-slots. Further, a point can be added to the images to be used in the album to increase the scores of in-focus images.

In step 11, whether all the images of the user-designated image group undergo the image scoring performed by the image scoring unit 907 in step 10 is determined. If not all the images undergo the image scoring (NO in step 11), the processing returns to step 10. On the other hand, if all the images undergo the image scoring (YES in step 11), the processing proceeds to step 12.

In step 12, the double-page spread allocation unit 909 determines whether the number of scenes (the number of sub-image groups) obtained by the scene division performed by the image classification unit 905 is equal to the number of double-page spreads which is input by the number-of-double-page-spreads input unit 908. If the number of scenes is not equal to the number of double-page spreads (NO in step 12), the processing proceeds to step 13. On the other hand, if the number of scenes is equal to the number of double-page spreads (YES in step 12), the processing proceeds to step 16. For example, if the number of divided scenes is eight and the number input by the number-of-double-page-spreads input unit 908 is eight, the processing proceeds to step 16.

In step 13, the double-page spread allocation unit 909 determines whether the number of scenes obtained by the scene division performed by the image classification unit 905 is less than the number of double-page spreads which is input by the number-of-double-page-spreads input unit 908. If the number of scenes is not less than the number of double-page spreads (NO in step 13), the processing proceeds to step 15. On the other hand, if the number of scenes is less than the number of double-page spreads (YES in step 13), the processing proceeds to step 14. For example, if the number of divided scenes is eight and the number input by the number-of-double-page-spreads input unit 908 is ten, the processing proceeds to step 14 because the number of scenes is less than the number of double-page spreads, the processing proceeds to step 14.

In step 14, the double-page spread allocation unit 909 performs sub-scene division. The sub-scene division is the further dividing of the divided scenes in the case where the number of divided scenes<the number of double-page spreads.

In step 15, the double-page spread allocation unit 909 performs scene combining. The scene combining is the combining of the divided scenes (sub-image groups) in the case where the number of scenes is greater than the number of double-page spreads.

In step 16, the double-page spread allocation unit 909 performs double-page spread allocation. As a result of steps 12 to 15, the number of sub-image groups becomes equal to the designated number of double-page spreads. In the present exemplary embodiment, the sub-image group of the earliest image capturing time/date is allocated to the first double-page spread. Specifically, the sub-image groups are allocated to the double-page spread pages of the album in the order of image capturing time/date. In this way, the album is created with the sub-image groups arranged in the order of image capturing time/date.

In step 17, the image selection unit 910 selects a predetermined number of images from the sub-image group. Specifically, the same number of images as the number of slots are extracted from the sub-image group allocated to the double-page spread. As to an extraction condition, an image with a high score is basically extracted for each slot, but it is desirable not to extract only the images of a limited image capturing period.

In step 18, the image layout unit 912 determines the image layout of the processing target double-page spread. The case where the template input unit 911 inputs the templates (1-1) to (4-4) in FIG. 17 with respect to the double-page spreads according to the designated template information will be described as an example. The number of slots in the input template is three. The orientations, either the longitudinal direction or the lateral direction, of the selected three images arranged in the order of image capturing time/date are as illustrated in FIG. 17. In this case, an image 1605 is an image selected for the main slot, and images 1606 and 1607 are images selected for the sub-slots. In the present exemplary embodiment, an image of an older image capturing time/date is laid out in the upper left of the template and an image of a more recent image capturing time/date is laid out in the lower right. Since the image 1605 is of the most recent image capturing time/date and is the image for the main slot, the templates (3-1) to (3-4) in FIG. 17 are determined as candidates. Further, the image 1606 of the older date for the sub-slots, i.e., the image desired to be laid out in the upper left, is a longitudinal image, and the image 1607 of the more recent date is a lateral image. Thus, the layout is determined with the template (3-2) as the most suitable template for the selected images. As described above, in step 18, the template for use in layout and information specifying for each image a slot of the template in which the image is to be laid out are determined.

In step 19, the image correction unit 914 performs image correction. In the present exemplary embodiment, dodging correction, red-eye correction, and contrast correction are automatically performed as image correction. The image correction is not performed if the image correction condition input unit 913 inputs "OFF".

In step 20, the layout information output unit 915 creates layout information. The images are laid out as determined in step 18. At this time, the images to be laid out are changed in size according to the size information about the slots of the template and then laid out. Then, bitmap data in which the images are laid out on the template is generated.

In step 21, whether all the double-page spreads undergo steps 17 to 20 is determined. If not all the double-page spreads undergo steps 17 to 20 (NO in step 21), the processing returns to step 17. On the other hand, if all the double-page spreads undergo steps 17 to 20 (YES in step 21), the automatic layout processing is ended.

The foregoing automatic layout processing is executed so that the pictures are laid out on the album and the layout result is displayed on the display unit 205. In the present exemplary embodiment, the layout result is editable by the user.

Figure 14:
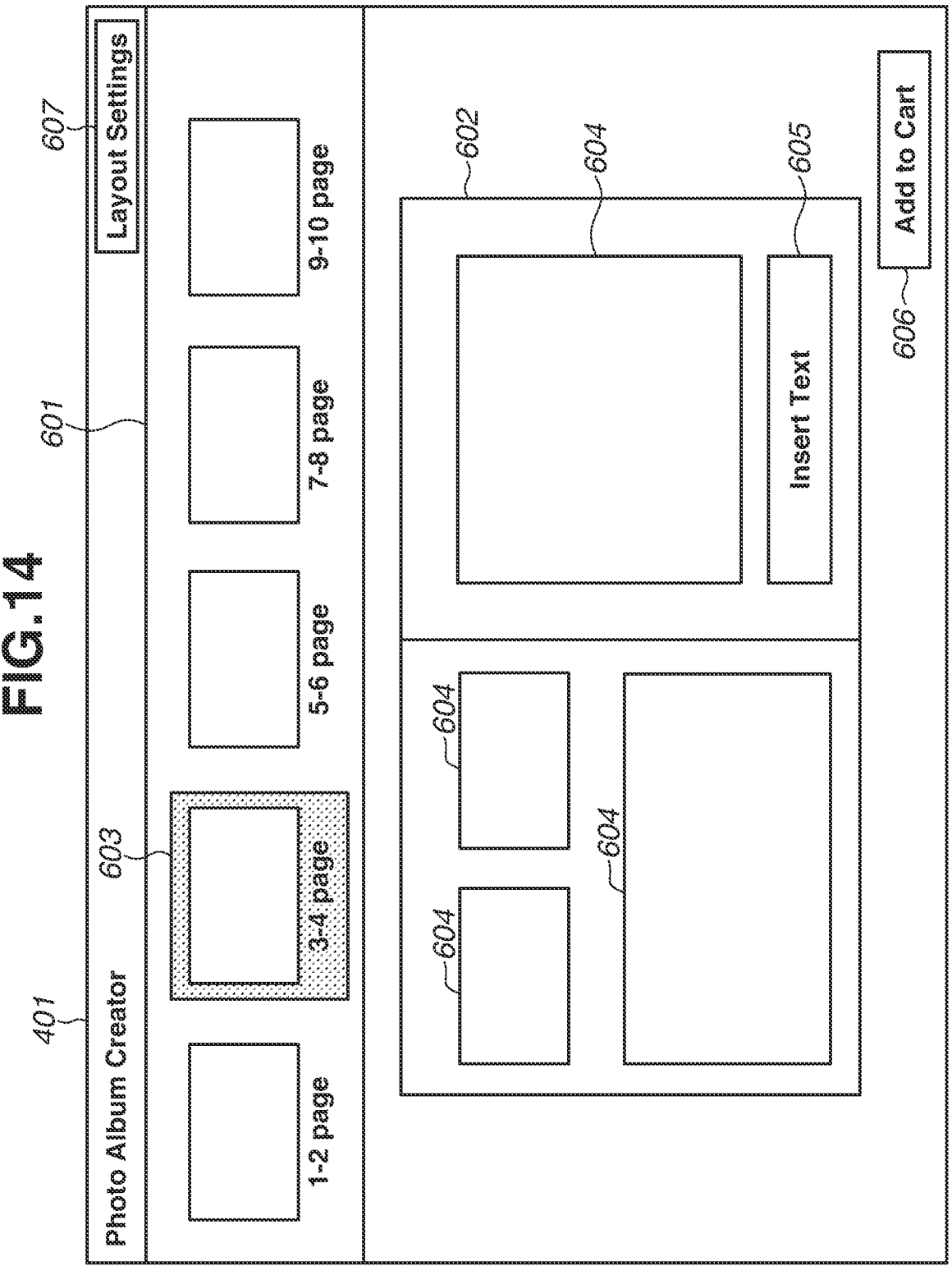
FIG. 14 is a schematic view illustrating a layout image editing screen.

FIG. 14 illustrates a layout editing screen. On the editing screen, the user can replace an automatically-laid-out picture with a different picture or can input characters to a textbox. In a thumbnail display region 601, if the user selects a desired thumbnail from among thumbnails, the double-page spread page is changed to a selected state 603. In FIG. 14, the double-page spread of the 3-4 page is in the selected state 603, and this page is displayed in a photo album display region 602 and becomes editable in the photo album display region 602. A picture is allocated to each picture slot 604, and text can be input to a textbox 605. After the editing is completed, the edited photo album is uploaded to a shopping cart via the Internet at the press of a button 606 for adding the photo album to the shopping cart.

[Standby Screen Display Control]

As described above, a plurality of analysis processes is performed during the execution of automatic layout processing, so that a certain amount of time is needed. The greater the number of images contained in the folder selected by the user on the basic setting screen in FIG. 4 is, the greater the number of analysis target (layout candidate) images becomes, so that the time also increases. Thus, in the present exemplary embodiment, a standby screen is displayed while the analysis processing for layout is executed, i.e., while the layout processing is executed. Specifically, the standby screen is displayed during the period from when an instruction to create an album is given on the design setting screen in FIG. 5 to when the layout editing screen in FIG. 14 is displayed. The analysis processing for generating a layout in the present exemplary embodiment includes not only the processing to be performed by the image analysis unit 904 in steps 02 to 04 but also the processing to be performed in steps 01 and 05 to 21 to obtain a layout result. Specifically, the analysis processing refers to the processing to be performed until the layout result is displayed after a layout start instruction is given.

Figure 6:
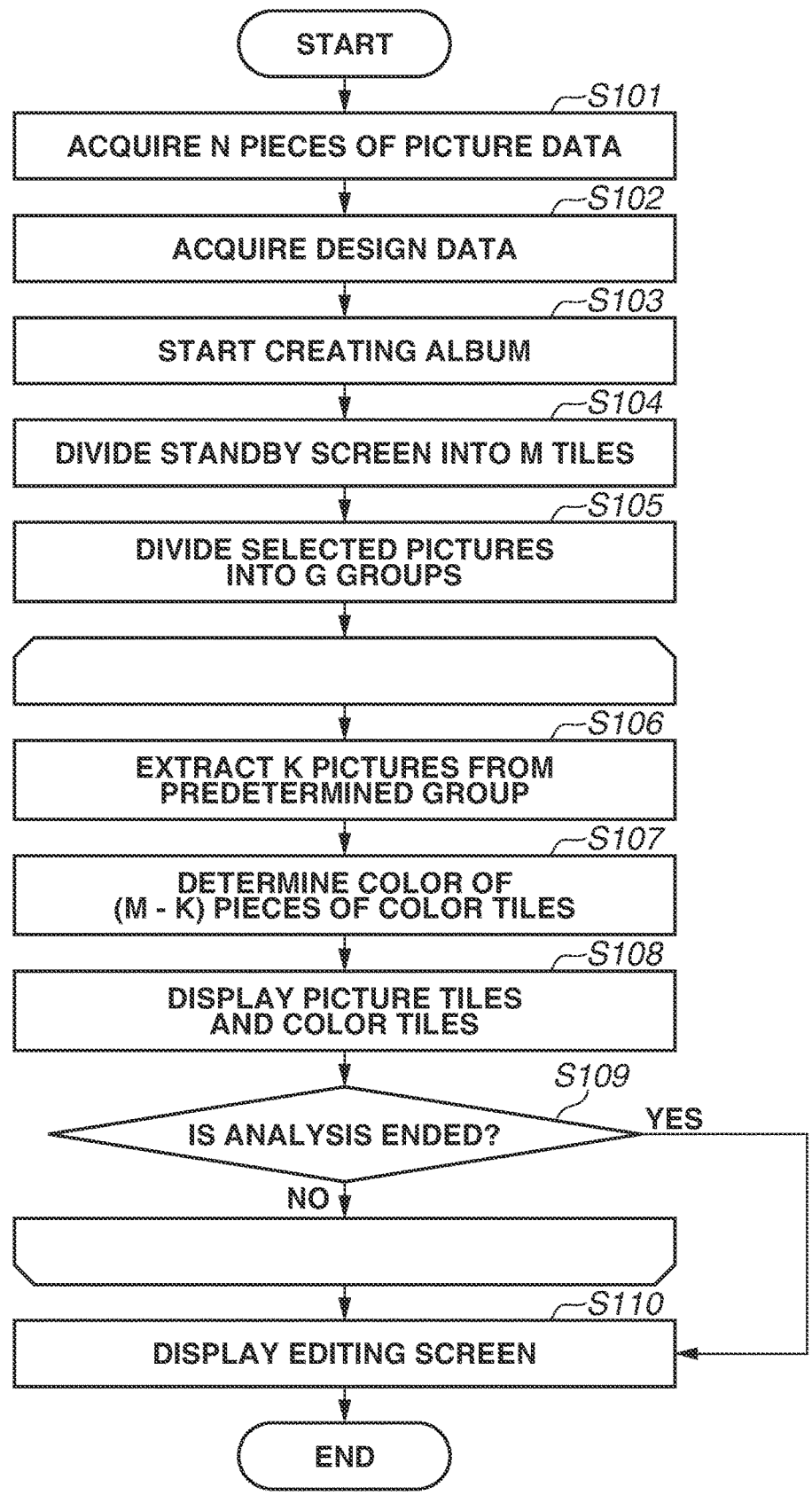
FIG. 6 is a flowchart illustrating a process of standby screen display control.

FIG. 6 is a flowchart illustrating a process of controlling the standby processing for displaying the standby screen in the present exemplary embodiment. For example, the CPU 204 reads a program stored in the HDD 202 into the ROM 203 or the RAM 201 and executes the program to realize the flowchart in FIG. 6.

First, in step S101, the CPU 204 acquires N (N is a positive integer) pieces of picture data contained in the folder selected by the user on the basic setting screen in FIG. 4. The N pieces of picture data are analysis target (layout candidate) image data in the automatic layout processing, and if the minimum number of pictures to create an album is set, N needs to be equal to or greater than the minimum number.

In step S102, the CPU 204 acquires design data selected by the user on the design setting screen in FIG. 5. The design data is the data to be reflected to the layout result which is to be eventually displayed by the automatic layout processing.

In step S103, the CPU 204 starts creating a photo album according to a user instruction. Specifically, the CPU 204 starts processing for automatic layout. Steps S101 to S103 are the processing for both automatic layout and standby screen display. If the processing of creating an album is started, the control for displaying a standby screen which indicates that the analysis for automatic layout is being executed is also started.

In step S104, the CPU 204 divides a region for a standby screen into M (M is a positive integer) regions (sections). In the present specification, the sections are referred to as tiles. The tiles in the present exemplary embodiment include a picture tile in which a picture extracted from among the N pieces of user-selected pictures is displayed and a color tile painted in the color of the background of the album.

Figure 7:
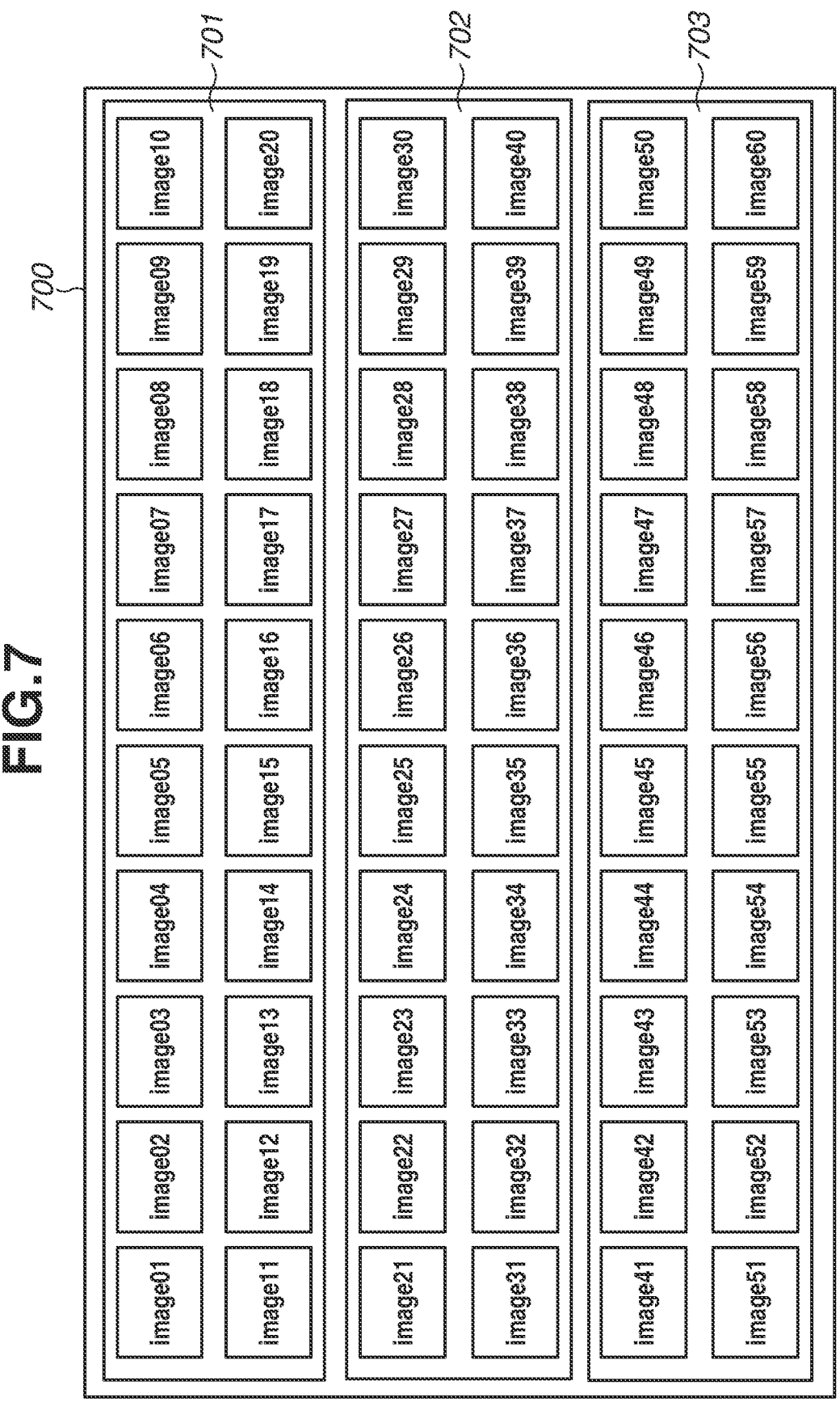
FIG. 7 is a schematic view illustrating the grouping of a plurality of images.

In step S105, the CPU 204 divides the N pieces of user-selected pictures into G groups (G is a positive integer and N≥G) to set the pictures to the tiles as picture tiles. FIG. 7 illustrates a list 700 of the N pieces of user-selected pictures. In FIG. 7, an example in which 60 pictures (image 01, image 02, . . . , image 60) are selected by the user is illustrated. In FIG. 7, the 60 pictures are divided into three groups which are groups 701, 702, and 703. Further, as to a method for the grouping, the pictures are sorted by name and then divided into a plurality of groups (three groups in the example) with respect to a predetermined number of pictures (20 pictures in the example). The method for the grouping is not particularly limited, and the grouping can be performed based on the image capturing time/date. Alternatively, if the scenes of the pictures are known in advance, the pictures can be grouped by scene. Further, the number of groups and the number of pictures in each group are not limited to the example illustrated in FIG. 7. In step S105, a predetermined threshold value is preset, and the N pieces of user-selected pictures are divided into a plurality of groups if N is not less than the predetermined threshold value. If the number of pictures N is less than the predetermined threshold value, the N pieces of pictures can be grouped as one group instead of being divided into a plurality of groups.

In step S106, the CPU 204 extracts K pictures (K is a positive integer) from a predetermined group.

In step S107, the CPU 204 determines the color of (M−K) pieces of color tiles. In the present exemplary embodiment, the color selected by the user on the design setting screen in FIG. 5 is determined as the color of the color tiles.

In step S108, the CPU 204 displays in the standby screen the K picture tiles to which the K pictures extracted in step S106 are set and the (M−K) pieces of color tiles each painted in the color determined in step S107. Steps S106 to S108 are performed for each group. Specifically, after a standby screen generated based on the first group 701 is displayed, a standby screen generated based on the second group 702 is displayed, and then a standby screen generated based on the third group 703 is displayed.

In step S109, the CPU 204 determines whether the automatic layout processing (analysis processing) is ended. If the analysis processing is not ended although the display of all the G groups is ended, steps S106, S107, and S108 are performed again, starting with the first group. Specifically, if the analysis processing is not ended although the respective standby screens based on the above-described three groups 701, 702, and 703 are displayed, step S106 is performed again with respect to the first group 701. If it is determined in step S109 that the analysis processing is ended, it is determined that the layout processing is ended, and the standby screen display processing is ended. Then, in step S110, the CPU 204 displays an editing screen (FIG. 14) for checking and editing the layout result.

Figure 8:
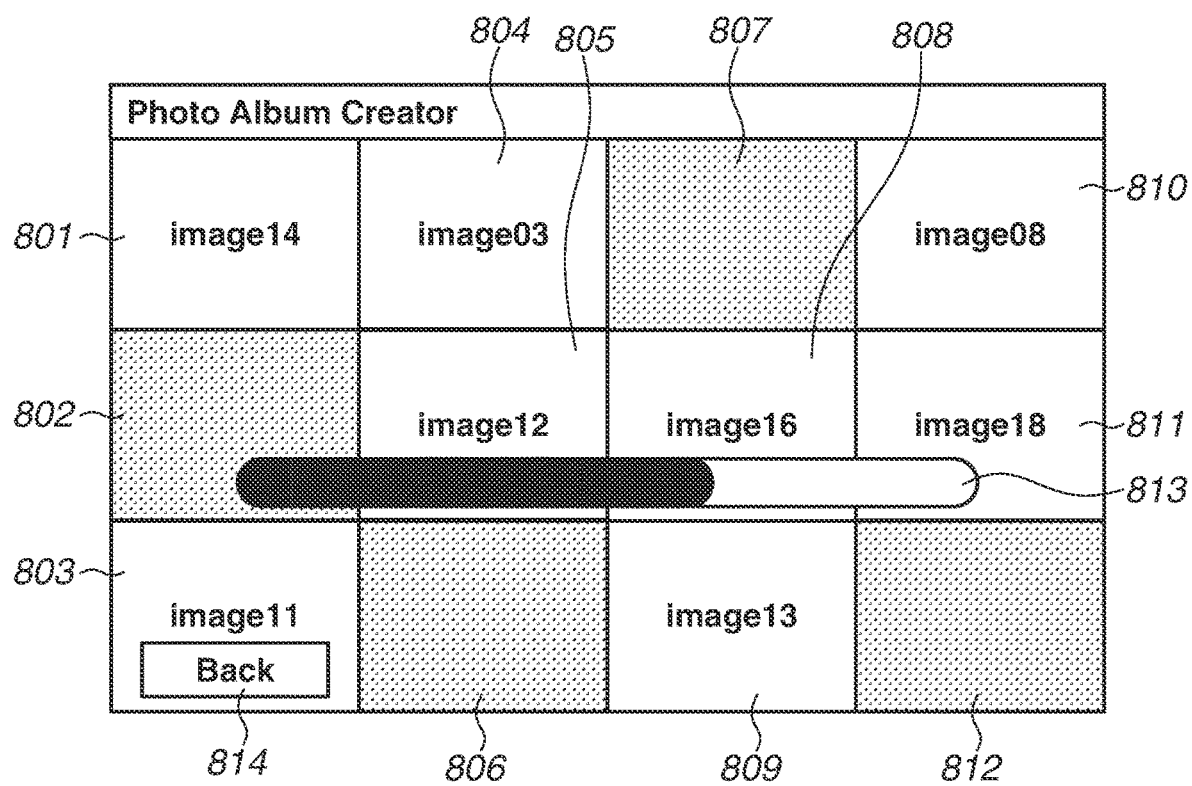
FIG. 8 is a schematic view illustrating an example of a standby screen.

FIG. 8 is a schematic view illustrating an example of a standby screen displayed at a timing. In the example, the standby screen is divided into M=12 tiles 801 to 812 in step S104. The number of divisions M is desirably large with respect to a terminal having a large screen size and is desirably small with respect to a smartphone, or the like having a small screen size. For example, if the album creation application is a universal application compatible with a plurality of devices such as PCs, smartphones, and tablet terminals, the number of divisions M can be determined based on information about the terminal in which the application is installed. Further, the number of divisions M can be changed dynamically such that the number of divisions M is increased if the window size is increased, e.g., maximized, during an operation on a single terminal whereas the number of divisions M is reduced if the window size is reduced.

In FIG. 8, tiles 801, 803, 804, 805, 808, 809, 810, and 811 are picture tiles to which the pictures extracted from among the plurality of pictures contained in the user-selected folder are set. FIG. 8 illustrates a standby screen at a timing, and pictures contained in one of the plurality of groups grouped in FIG. 7 are extracted. In FIG. 8, images 14, 11, 03, 12, 16, 13, 08, and 18 are respectively set to tiles 801, 803, 804, 805, 808, 809, 810, and 811 from the group 701 as an example. Displaying such picture tiles on the standby screen makes it easier for the user to image how the pictures contained in the user-selected folder are laid out. The pictures to be extracted from the group are randomly selected from the group. Alternatively, the selection may be associated with the analysis processing. Specifically, as the analysis processing progresses, desirably pictures with high scores are preferentially selected from among the pictures in any groups having undergone the scoring analysis processing in step 10 in FIG. 16. This makes it easier to image a layout result to be displayed after the analysis processing.

In FIG. 8, the tiles 802, 806, 807, and 812 are color tiles filled with a specific color. The color of the background color 506 set based on the user selection on the design setting screen in FIG. 5 is set as the tile color. In this way, the album color selected by the user is displayed together with the pictures so that it is possible to give the user the impression that the pictures are laid out on the album. Further, if the color set on the design setting screen in FIG. 5 differs between the background color of the front page of the album and the background color of the body of the album, it is desirable to cause the color tiles of both colors to appear. Specifically, the color tiles of the background colors of the front page and the body are caused to appear at a predetermined probability. In this way, the impression that the pictures are laid out on the front page and the body can be given to the user. For example, the color tiles are displayed at the probability that the ratio between the background color of the front page and the background color of the body is 3:2 to thereby be able to give the user an image of a combination of the backgrounds of the front page and the body and the pictures. If the picture size is large, or the like, the processing of reading pictures takes time, so that an arrangement of displaying color tiles only, or the like can be made during the time to prevent the user from becoming bored even during the period in which the pictures cannot be displayed.

As described above, the picture tiles and the color tiles are displayed in combination in the standby screen to be able to give the user an image of the album even during a wait time in the analysis in the layout processing. Further, since the user can image how the album is created, the possibility that the user stops the processing during the analysis processing can be reduced. The tiles to be displayed together with the picture tiles are not limited to the color tiles. For example, the tiles can be tiles that indicate the texture (feel) of the album which is selected by the user. Further, the tiles can be tiles that indicate the shape of the album. Specifically, tiles that indicate information about the album are to be displayed together with the picture tiles.

A progress bar 813 is displayed in the standby screen in FIG. 8 to express the progress of the analysis processing. As the analysis processing progresses, the bar also progresses. As to a display item from which the progress is recognizable, not only the progress bar but also the remaining time, etc. can be displayed. Further, if the CPU 204 cannot determine the progress, an unspecified amount of progress can be displayed, and the display form of the progress is not limited. It is obvious that the display of the progress bar is not indispensable and the progress bar can be omitted. A back button 814 for stopping the analysis processing during the analysis processing to return to the previous screen is displayed in the standby screen. When the back button 814 is pressed, the screen returns to the design setting screen in FIG. 5.

Figure 9:
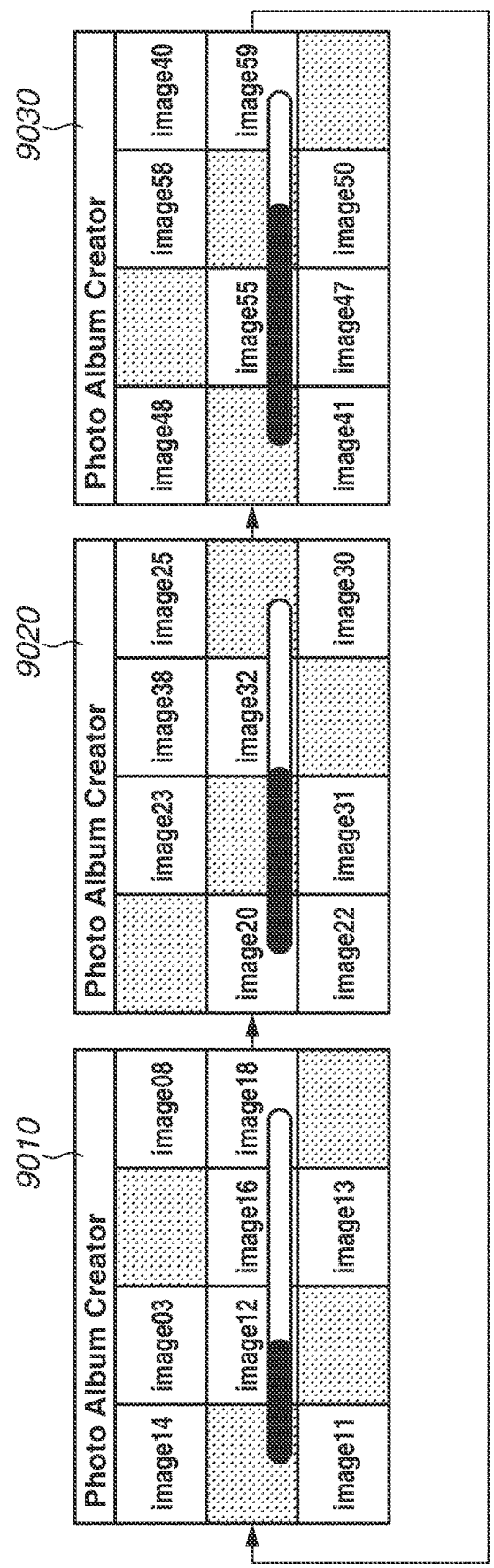
FIG. 9 is a schematic view illustrating an example of a standby screen.

FIG. 9 is a schematic view illustrating how the standby screen is changed in units of group. As described above with reference to FIG. 7, the pictures contained in the user-selected folder are divided into three groups in the present exemplary embodiment. In FIG. 9, a standby screen 9010 is the standby screen of the case where pictures are selected from the first group 701. A standby screen 9020 is the standby screen of the case where pictures are selected from the second group 702. A standby screen 9030 is the standby screen of the case where pictures are selected from the third group 703. In FIG. 9, after the standby screen 9010 is displayed for a predetermined time, the standby screen 9020 is displayed next for a predetermined time, and then the standby screen 9030 is displayed for a predetermined time. Specifically, the standby screens 9010, 9020, and 9030 are displayed during the first, second, and third periods, respectively. The numbers of picture tiles in the respective standby screens 9010, 9020, and 9030 can be the same number which is a predetermined number or different numbers. Further, as to the display of the times in each standby screen, the display of all the tiles can be switched at the same timing, or the picture tiles and the color tiles can be switched sequentially at short intervals. Specifically, the previous standby screen is changed to the next standby screen by sequentially switching some tiles to the tiles in the next standby screen or by switching all the tiles in the previous standby screen at the same time to the tiles in the next standby screen.

After the standby screen 9030 is displayed for the predetermined time, the screen returns to the first standby screen 9010. In this way, the standby screen is changed to thereby give the user the impression that the pages of the album are flipped. When the standby screen 9010 is displayed again, pictures different at least partially from the initially selected pictures can be selected from the group 701 and displayed. Specifically, in a fourth period, pictures different at least partially from the images 14, 11, 03, 12, 16, 13, 08, and 18 displayed during the first period can be selected from the group 701. The number of picture tiles during the first period can be equal to or different from the number of picture tiles during the second period. Even when the pictures of the same combination as in the first period are used, it is desirable to cause a change in the standby screen by changing the positions of the respective picture tiles.

Further, in the present exemplary embodiment, it is also desirable to cause a change in the standby screen by changing the positions and number of color tiles with time, e.g., between the consecutive first and second periods.

In a second exemplary embodiment, the case where the number of pictures contained in the user-selected folder is small will be described as an example below. The configuration of the information processing apparatus 1 and details of the automatic layout processing are similar to those in the first exemplary embodiment, and therefore, description thereof is omitted. Similarly, as to the sequence of display control, the points that are different from those in the first exemplary embodiment will be mainly described below.

Specifically, an example of the case where the number of the plurality of pictures (the number of pictures N) contained in the folder selected by the user in step S101 in FIG. 6 is small and only one group is generated in step S105, i.e., G=1, will be described below.

Figure 10:
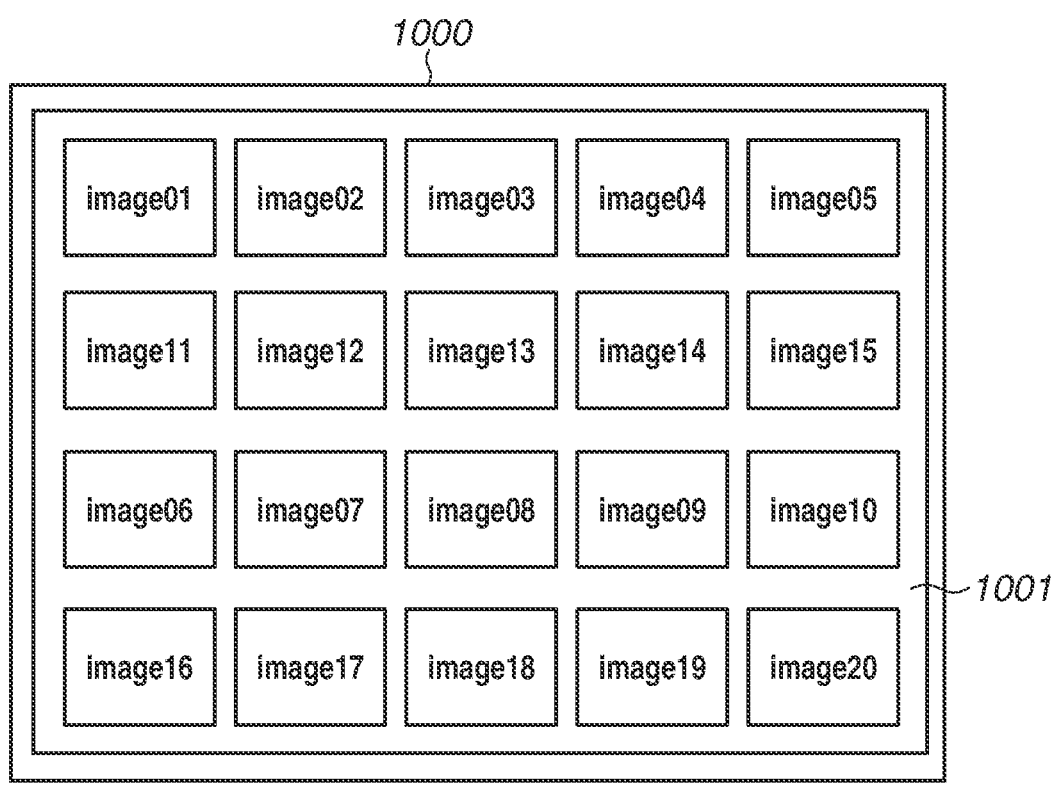
FIG. 10 is a schematic view illustrating a plurality of images.

FIG. 10 is a schematic view illustrating a list of a plurality of pictures contained in the user-selected folder. N (N=20) pieces of user-selected pictures (image 01, image 02, . . . , image 20) are listed by name in a picture list 1000. In the case of this example, since the number of pictures is small, only one group 1001 is generated as a result of execution of the processing of dividing the picture list 1000 into a predetermined number of groups in step S105. Specifically, in step S105, a predetermined threshold value is preset, and if the number of pictures N is less than the threshold value, the N pictures are not divided into a plurality of groups but treated as one group. The N pictures may be treated as one group not only in the case where the number of pictures N is small but also in the case where the number of scenes classified by the image classification unit 905 is less than a predetermined number. Even if the number of pictures N is large, the pictures N can be treated as one group if all the pictures are close in image capturing time/date.

Figure 11:
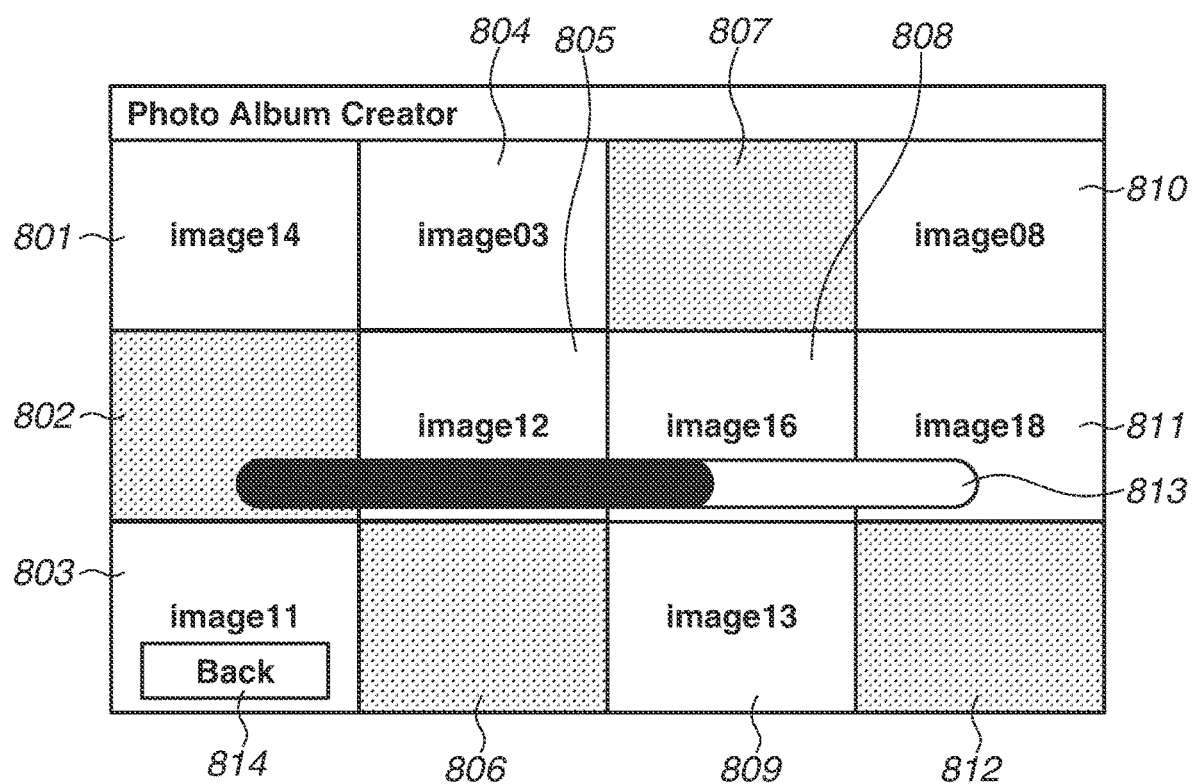
FIG. 11 is a schematic view illustrating an example of a standby screen.

FIG. 11 illustrates an example of the standby screen in the present exemplary embodiment. The standby screen displays picture tiles to which pictures extracted from the group 1001 are set and color tiles and is similar to the standby screen in FIG. 8 which is described above in the first exemplary embodiment. Therefore, detailed description thereof is omitted.

Figure 12:
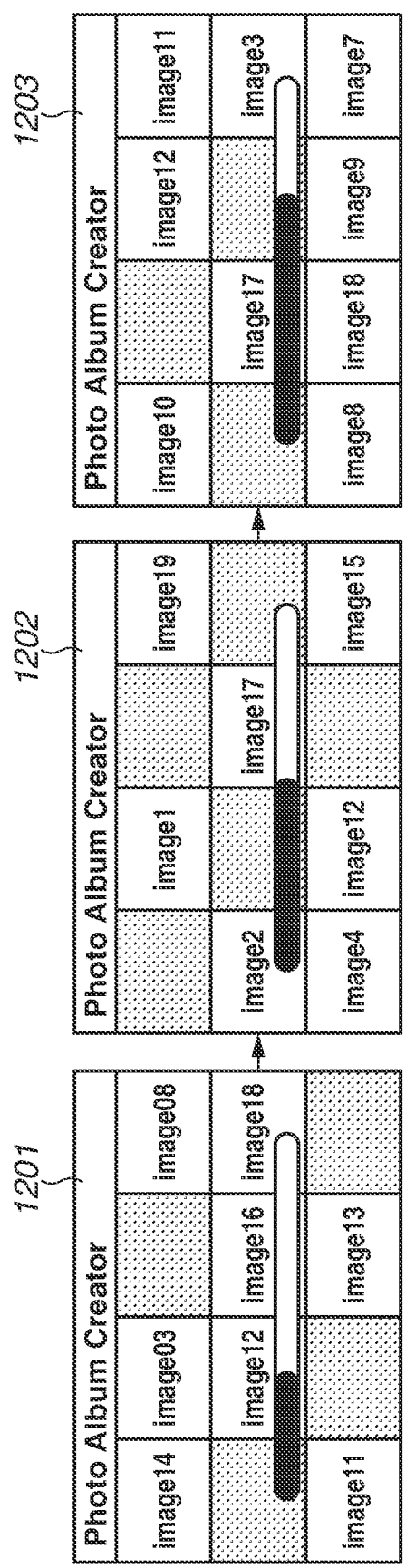
FIG. 12 is a schematic view illustrating an example of a standby screen.

FIG. 12 is a schematic view illustrating a temporal change in the standby screen in the present exemplary embodiment. In FIG. 12, after a standby screen 1201 is displayed for a predetermined time, a standby screen 1202 is displayed next for a predetermined time, and then a standby screen 1203 is displayed for a predetermined time. Specifically, the standby screens 1201, 1202, and 1203 are respectively displayed during the first, second, and third periods. In the present exemplary embodiment, all the user-selected pictures are treated as one group 1001. Thus, the standby screens 1201, 1202, and 1203 all display pictures extracted from among the pictures contained in the group 1001. The standby screen 1201, 1202, and 1203 do not display the same pictures in the same positions but displays different pictures, and the positions and number of picture tiles are partially changed. The pictures in the standby screens 1201 to 1203 do not necessarily have to be entirely replaced with time (e.g., between the standby screens 1201 and 1202), and at least some of the pictures can be replaced. Even if all the extracted pictures are the same, the standby screens are still prevented from being monotonous if the positions of the pictures tiles are changed with time.

Further, in FIG. 12, the number and positions of color tiles in the respective standby screens are changed. As to the number of color tiles, the standby screens 1201, 1202, and 1203 respectively display four color tiles, five color tiles, and three color tiles.

Thus, an animation of repeatedly displaying the standby screens 1201, 1202, 1203, . . . is employed, and the pictures used in the respective standby screens and the positions of the pictures are changed or the number and positions of color tiles are changed. In this way, arrangements are made to prevent the user from becoming bored even when there is only one group. Further, if color tiles are displayed next to each other in one standby screen, the balance between the picture tiles and the color tiles is lowered, so that desirably the color tiles are controlled not to be adjacent to each other. For example, in the case where a tile is to be set as a color tile, whether any one of the upper, lower, right, and left adjacent tiles is a color tile is determined, and if any one of the upper, lower, right, and left adjacent tiles is a color tile, the tile is desirably set as a picture tile. Further, if the positions of the color tiles in the previous standby screen are the same as those in the next standby screen, it is difficult for the user to recognize that the screen is switched, so that the picture tiles are desirably displayed in positions different from those in the previous standby screen.

Further, the display of all the tiles in the standby screens can be switched at the same timing, or the picture tiles and the color tiles can be sequentially switched at short intervals. Specifically, the previous standby screen is changed to the next standby screen by sequentially switching some tiles to the tiles in the next standby screen or by switching all the tiles in the previous standby screen at the same time to the tiles in the next standby screen.

In a third exemplary embodiment, an example in which the images in the standby screens are changed based on the analysis by the automatic layout processing will be described below. The configuration of the information processing apparatus 1 and details of the automatic layout processing are similar to those in the first and second exemplary embodiments, and therefore, description thereof is omitted. The sequence of display control is also basically similar to those in the first and second exemplary embodiments, and therefore, only different points will be described below.

Figure 13:
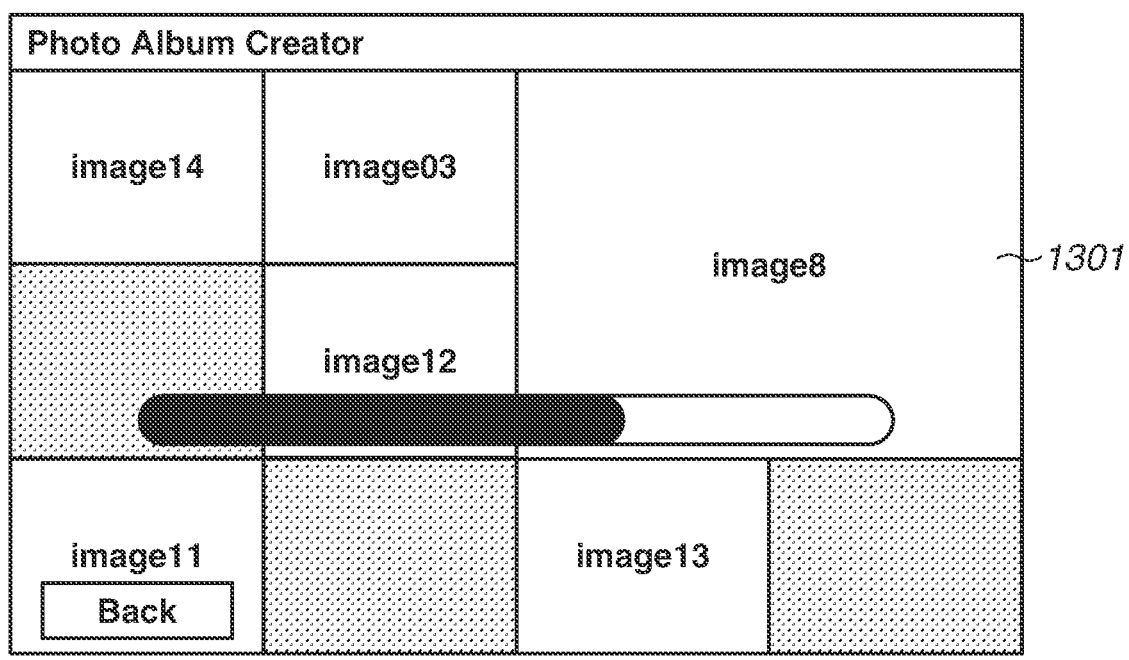
FIG. 13 is a schematic view illustrating an example of a standby screen.

FIG. 13 is a schematic view illustrating an example of the standby screen in the present exemplary embodiment. In this example, the area of the tile to which the image 08 is set is larger than those of the other tiles. The reason therefor is that the picture of the image 08 is analyzed for the automatic layout processing and determined as a suitable picture for use in the album. Specifically, as the analysis processing progresses, a score is given to each picture having undergone the scoring analysis processing in step 10 in FIG. 16. Then, based on the scores, the picture with a high score is displayed in an increased tile area because a picture with a high score is more likely to be laid out on the album.

As described above, in the present exemplary embodiment, as the analysis progresses, a score as a result of the analysis is given to the picture having undergone the analysis processing, and therefore, the display is desirably changed by increasing or emphasizing the picture tile, based on the score. The present exemplary embodiment is not limited to the example in which the tile size is changed or emphasized, and the pictures with high scores may be set preferentially to the picture tiles. Further, the pictures with low scores can be not displayed.

In the present exemplary embodiment, the display of the standby screens is associated with a result of analysis which accompanies the progress of analysis processing so that an image close to an album to be finally obtained can be provided for the user.

The present disclosure is capable of providing a standby screen which does not become monotonous and is likely to evoke an image of a layout, during a standby time until a layout result is displayed.

The present disclosure provides technological improvements or unconventional solutions in advancements and/or improvements in display control of information processing technology through use of specific manners of use with specific limitations on available data and configurational states.

OTHER EMBODIMENTS

Embodiment(s) of the present disclosure can also be realized by a computerized configuration(s) of a system or apparatus that read(s) out and execute(s) computer executable instructions (e.g., one or more programs) recorded on a storage medium (which may also be referred to more fully as a 'non-transitory computer-readable storage medium') to perform the functions of one or more of the above-described embodiment(s) and/or that include(s) one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors (e.g., central processing unit (CPU), micro processing unit (MPU)) and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-115990, filed Jun. 13, 2017, which is hereby incorporated by reference herein in its entirety.

What is claimed is:

1. An information processing apparatus comprising:
at least one processor; and
at least one memory storing instructions that, when executed by the at least one processor, cause the information processing apparatus to:
acquire a plurality of images;
execute analyzing processing for laying out at least one of the plurality of images, wherein the analyzing processing includes scoring the at least one of the plurality of images;
determine whether the analyzing processing has been completed;
cause a display unit to display a layout result generated based on the analyzing processing; and
execute standby processing for displaying a standby screen while the analyzing processing is executed before the layout result is displayed,
wherein, in a case where it is determined that the analyzing processing has not been completed, the standby screen in which a predetermined number of images among the acquired plurality of images are included is displayed based on the determination result and, in a case where it is determined that the analyzing processing has been completed, the layout result is displayed based on the determination result.

2. The information processing apparatus according to claim 1, wherein the image(s) to be displayed in the standby screen during a first period is/are different from the image(s) to be displayed in the standby screen during a second period.

3. The information processing apparatus according to claim 1, wherein in a case where a number of the plurality of acquired images is not less than a predetermined threshold value, the standby processing
divides the plurality of images into a plurality of groups,
extracts at least some of the images from a first group among the plurality of groups and extracts at least some of the images from a second group among the plurality of groups, and
displays in the standby screen the image(s) extracted from the first group during a first period and displays in the standby screen the image(s) extracted from the second group during a second period.

4. The information processing apparatus according to claim 1, wherein in a case where a number of the plurality of acquired images is less than a predetermined threshold value, the standby processing extracts at least some of the plurality of images being one group and displays the extracted image(s) in the standby screen, and
wherein the image(s), which is/are displayed in the standby screen during a first period, extracted from among the plurality of images is/are different at least partially from the image(s), which is/are displayed in the standby screen during a second period, extracted from among the plurality of images.

5. The information processing apparatus according to claim 1, wherein the at least one processor further causes the information processing apparatus to execute processing to display a setting screen for creating a photo album,
wherein the standby screen includes a region where the image(s) is/are to be displayed and a region where a color of the photo album selected by a user on the setting screen is to be displayed.

6. The information processing apparatus according to claim 1, wherein the standby processing randomly extracts from among the plurality of images an image to be displayed in the standby screen.

7. The information processing apparatus according to claim 1,
wherein the analyzing processing analyzes the plurality of images and determines an image to be used for the layout based on an analysis result, and
wherein the standby processing controls the display of the images in the standby screen based on the analysis result.

8. The information processing apparatus according to claim 1, wherein the standby processing displays information from which progress of the processing for layout in the standby screen is recognizable.

9. The information processing apparatus according to claim 1, wherein the information processing apparatus creates photo album data based on the data on the plurality of images.

10. The information processing apparatus according to claim 9, wherein a user can order a photo album using a shopping site, after creating the photo album data.

11. A control method comprising:
acquiring a plurality of images;
executing analyzing processing for laying out at least one of the plurality of images, wherein the analyzing processing includes scoring the at least one of the plurality of images;
determining whether the analyzing processing has been completed;
displaying a layout result generated based on the analyzing processing; and
executing standby processing for displaying a standby screen while the analyzing processing is executed before the layout result is displayed,
wherein, in a case where it is determined that the analyzing processing has not been completed, the standby screen in which a predetermined number of images among the acquired plurality of acquired images are included is displayed based on the determination result and, in a case where it determined that the analyzing processing has been completed, the layout result is displayed based on the determination result.

12. The control method according to claim 11, wherein the image(s) to be displayed in the standby screen during a first period is/are different from the image(s) to be displayed in the standby screen during a second period.

13. The control method according to claim 11,
wherein in a case where a number of the plurality of acquired images is not less than a predetermined threshold value,
the plurality of images is divided into a plurality of groups,
at least some of the images are extracted from a first group among the plurality of groups, and at least some of the images are extracted from a second group among the plurality of groups, and
the image(s) extracted from the first group is/are displayed in the standby screen during a first period, and the image(s) extracted from the second group is/are displayed in the standby screen during a second period.

14. The control method according to claim 11,
wherein in a case where a number of the plurality of acquired images is less than a predetermined threshold value, at least some of the plurality of images being one group are extracted and displayed in the standby screen, and
wherein the image(s), which is/are displayed in the standby screen during a first period, extracted from among the plurality of images is/are different at least partially from the image(s), which is/are displayed in the standby screen during a second period, extracted from among the plurality of images.

15. The control method according to claim 11, further comprising executing processing to display a setting screen for creating a photo album,
wherein the standby screen includes a region where the image(s) is/are to be displayed and a region where a color of the photo album selected by a user on the setting screen is to be displayed.

16. The control method according to claim 11, wherein an image to be displayed in the standby screen is randomly extracted from among the plurality of images.

17. The control method according to claim 11,
wherein in the processing for layout, the plurality of images is analyzed, and an image to be used for the layout is determined based on an analysis result, and
wherein the display of the images in the standby screen is controlled based on the analysis result.

18. The control method according to claim 11, wherein information from which progress of the processing for layout in the standby screen is recognizable is displayed.

19. The control method according to claim 11, further comprising creating photo album data based on the data on the plurality of images.

20. The control method according to claim 19, wherein a user can order a photo album using a shopping site, after creating the photo album data.

21. A storage medium storing a program for executing a control method comprising:
acquiring a plurality of images;
executing analyzing processing in which a score of each of the images is analyzed for laying out at least one of the plurality of images, wherein the analyzing processing includes scoring the at least one of the plurality of images;
determining whether the analyzing processing has been completed;
displaying a layout result generated based on the analyzing processing; and
executing standby processing for displaying a standby screen while the analyzing processing is executed before the layout result is displayed,
wherein, in a case where it is determined that the analyzing processing has not been completed, the standby screen in which a predetermined number of images among the acquired plurality of images are included is displayed based on the determination result and, in a case where it determined that the analyzing processing has been completed, the layout result is displayed based on the determination result.

22. The information processing apparatus according to claim 1, wherein the displayed layout result is not dependent on the standby screen.

23. The control method according to claim 11, wherein the displayed layout result is not dependent on the standby screen.

* * * * *